(12) United States Patent
Haga et al.

(10) Patent No.: US 7,808,585 B2
(45) Date of Patent: Oct. 5, 2010

(54) COLOR FILTER AND COLOR LCD APPARATUS HAVING RED FILTER WITH A PEAK WAVELENGTH BETWEEN 685 NM AND 690 NM AND A RED LIGHT SOURCE HAVING A PEAK WAVELENGTH OF BETWEEN 640 NM AND 645 NM

(75) Inventors: Shuichi Haga, Kanagawa (JP); Koichiro Kakinuma, Tokyo (JP); Takehiro Nakatsue, Kanagawa (JP); Tatsuhiko Matsumoto, Tokyo (JP); Yasuhiro Tagawa, Tokyo (JP); Yutaka Ota, Kanagawa (JP); Takashi Oku, Saitama (JP); Takeo Arai, Saitama (JP)

(73) Assignee: Sony Corporation, Tokyo (JP)

( * ) Notice: Subject to any disclaimer, the term of this patent is extended or adjusted under 35 U.S.C. 154(b) by 614 days.

(21) Appl. No.: 11/631,543

(22) PCT Filed: Jul. 12, 2005

(86) PCT No.: PCT/JP2005/012840

§ 371 (c)(1),
(2), (4) Date: Nov. 14, 2007

(87) PCT Pub. No.: WO2006/009009

PCT Pub. Date: Jan. 26, 2006

(65) Prior Publication Data

US 2008/0186433 A1    Aug. 7, 2008

(30) Foreign Application Priority Data

Jul. 15, 2004  (JP) ............................. 2004-208919
Sep. 3, 2004   (JP) ............................. 2004-257785

(51) Int. Cl.
*G02F 1/1335* (2006.01)

(52) U.S. Cl. .................................................... 349/106

(58) Field of Classification Search .......... 349/106–109
See application file for complete search history.

(56) References Cited

U.S. PATENT DOCUMENTS 5,475,512 A    12/1995    Nakazawa et al.

(Continued)

FOREIGN PATENT DOCUMENTS

DE    10 2004 023186 A1    12/2005

(Continued)

OTHER PUBLICATIONS

Moriya, N. et al., "New Color Filter for Light-Emitting Diode Back Light", Japanese Journal of Applied Physics, Apr. 1, 2003, p. 1637-1641, vol. 42 No. 4A, Japan Society of Applied Physics, Tokyo, Japan.

(Continued)

*Primary Examiner*—John Heyman
(74) *Attorney, Agent, or Firm*—Wolf, Greenfield & Sacks, P.C.

(57) ABSTRACT

A color filter (19) used in a transmissive color liquid crystal display panel of a color liquid crystal display (LCD) apparatus. This color filter (19) is constituted by a tristimulus color filter for wavelength-selecting and transmitting red light, green light and blue light. Mixing of blue color and red color is prohibited by not having the transmission wavelength band of the red filter CFR overlaid substantially on the transmission wavelength band of the blue filter CFB.

9 Claims, 28 Drawing Sheets

U.S. PATENT DOCUMENTS

| | | | |
|---|---|---|---|
| 6,055,033 A | 4/2000 | Yamaguchi et al. |
| 6,580,476 B2 | 6/2003 | Hasegawa |
| 6,633,301 B1 | 10/2003 | Dallas et al. |
| 6,636,282 B2 | 10/2003 | Ogawa et al. |
| 6,697,134 B2 | 2/2004 | Watanabe et al. |
| 6,799,865 B2 | 10/2004 | Ellens et al. |
| 6,817,735 B2 | 11/2004 | Shimizu et al. |
| 7,184,110 B2 | 2/2007 | Kim et al. |
| 7,201,493 B2 | 4/2007 | Martynov et al. |
| 7,213,960 B2 | 5/2007 | Yoo |
| 7,281,816 B2 | 10/2007 | Suzuki |
| 7,295,260 B2 | 11/2007 | Harayama et al. |
| 7,324,080 B1 | 1/2008 | Hu et al. |
| 7,474,366 B2 | 1/2009 | Haga et al. |
| 2001/0035853 A1 | 11/2001 | Hoelen et al. |
| 2003/0063062 A1 | 4/2003 | Tsumura et al. |
| 2005/0184952 A1 | 8/2005 | Konno et al. |
| 2005/0219443 A1 | 10/2005 | Tanaka et al. |
| 2006/0007111 A1 | 1/2006 | Moon et al. |
| 2006/0007367 A1 | 1/2006 | Cho |
| 2006/0152468 A1 | 7/2006 | Ozaki |
| 2006/0164580 A1 | 7/2006 | Ueda et al. |
| 2007/0297172 A1 | 12/2007 | Furukawa |
| 2008/0036943 A1 | 2/2008 | Matsumoto et al. |
| 2008/0100551 A1 | 5/2008 | Haga et al. |
| 2008/0111960 A1 | 5/2008 | Yoshida et al. |
| 2008/0129680 A1 | 6/2008 | Kimura et al. |
| 2008/0174544 A1 | 7/2008 | Ueda et al. |
| 2008/0225197 A1 | 9/2008 | Maruyama et al. |

FOREIGN PATENT DOCUMENTS

| | | | |
|---|---|---|---|
| EP | 1672706 A | 6/2006 |
| EP | 1863009 A | 12/2007 |
| JP | 7-325214 | 12/1995 |
| JP | 10-260402 A | 9/1998 |
| JP | 11-183891 | 7/1999 |
| JP | 2001-135118 A | 5/2001 |
| JP | 2001-272938 A | 10/2001 |
| JP | 2002-099250 A | 4/2002 |
| JP | 2003-131229 A | 5/2003 |
| JP | 2003-207770 A | 7/2003 |
| JP | 2003-228067 A | 8/2003 |
| JP | 2003-233062 A | 8/2003 |
| JP | 2003-532153 A | 10/2003 |
| JP | 2003-331608 A | 11/2003 |
| JP | 2004-118133 A | 4/2004 |
| JP | 2004-212503 A | 7/2004 |
| JP | 2004-246117 A | 9/2004 |
| JP | 2005-091526 A | 4/2005 |
| JP | 2005-100932 A | 4/2005 |
| JP | 2005-234134 A | 9/2005 |
| JP | 2005-242270 A | 9/2005 |
| JP | 3766042 | 2/2006 |
| JP | 2006-058484 A | 3/2006 |
| JP | 2008-051905 A | 3/2008 |
| JP | 2008-052131 A | 3/2008 |
| JP | 2008-116914 A | 5/2008 |
| JP | 2008-122713 A | 5/2008 |
| WO | WO 01/84227 A1 | 11/2001 |
| WO | WO 2006/006537 A1 | 1/2006 |
| WO | WO 2007/141732 A2 | 12/2007 |

OTHER PUBLICATIONS

Poynton, "Digital Video and HDTV, Algorithms and Interfaces", Jan. 1, 2003, pp. 203-207, 224; Morgan Kaufmann, San Francisco, CA, USA.

COLOR FILTER AND COLOR LCD APPARATUS HAVING RED FILTER WITH A PEAK WAVELENGTH BETWEEN 685 NM AND 690 NM AND A RED LIGHT SOURCE HAVING A PEAK WAVELENGTH OF BETWEEN 640 NM AND 645 NM

TECHNICAL FIELD

This invention relates to a color liquid crystal display (LCD) apparatus and, more particularly, to a color liquid crystal display apparatus with which the color gamut can be made broader to assure more faithful color reproducing performance. The present application claims priority rights on the basis of the Japanese Patent Applications 2004-208919 and 2004-257785, filed in Japan on Jul. 15, 2004 and on Sep. 3, 2004, respectively. The contents of these Patent Applications are to be incorporated by reference in the present application.

BACKGROUND ART

Among standard color spaces for computer display, there is the sRGB standard prescribed by IEC (International Electrotechnical Commission). This standard gives a definition on the relationship between a video signal RGB and the calorimetric values by having chromaticity points of three prime colors of red (R), green (G) and blue (B) coincide with the colorimetric parameters of Rec.709 recommended by ITU-R (International Telecommunication Union Radio communication). In a display apparatus, complying with this sRGB standard, if a video signal RGB is applied, the calorimetrically same color may be displayed.

Meanwhile, with a picture unit, receiving and displaying the color information, captured by a camera or a scanner, such as a display or a printer it is essential to demonstrate the received color information accurately. For example, if a camera has captured the color information accurately, but a display demonstrates the color information only inappropriately, color reproduction performance of the system on the whole is deteriorated.

In a current standard monitor device, the display is prescribed by the color gamut of the sRGB standard. In actuality, there are many colors beyond the color gamut of sRGB, such that there are object colors that cannot be represented by a standard monitor device complying with the sRGB standard. For example, with a halide film used in a camera, or with a digital camera printer, the range of sRGB has already been exceeded. If the broad dynamic range is procured, and an image pickup operation is carried out correctly, there are produced object colors that cannot be represented on a standard monitor device of the sRGB standard.

The sYCC, having a color space broader than that of sRGB, has been adopted as a standard by business circles, in order to cope with the color gamut which has become broader. The sYCC has derived, from the sRGB, the luminance difference color difference separation space, using ITU-R BT.601, which is the international standard of a transformation matrix from RGB to YCC as defined for high vision television. The color gamut of sYCC is broader as the color space, such that, with the sYCC, the color outside sRGB can be represented.

On the other hand, in the NTSC system, adopted as the broadcast system for color television, the bandwidth is broader than in sRGB. If sYCC is to be implemented, the color gamut on the display with sYCC needs to be equivalent to or even exceed that of the NTSC system on a display.

On the other hand, a TV receiver of an extremely thin thickness, such as a liquid crystal display (LCD) or a plasma display panel (PDP), has been developed and put to practical use, to take the place of the cathode ray tube (CRT) which has long been used since the start of TV broadcasting. In particular, a color liquid crystal display, employing a color liquid crystal display panel, is expected to become popular in an accelerated fashion because it permits driving with low power consumption and the large-sized color liquid crystal display panel has become less expensive.

As for the color liquid crystal display apparatus, the backlight system, in which a transmissive color liquid crystal display panel is illuminated from its backside with a backlight device to display a color picture, is in the mainstream. The light source, preferentially used for the backlight device, is a CCFL (Cold Cathode Fluorescent Lamp), emitting white light using a fluorescent tube.

In general, in a transmissive color liquid crystal display apparatus, a color filter, employing a tristimulus filter of spectral characteristics, shown for example in FIG. 1, made up of a blue filter CFB0 (460 nm), a green filter CFG0 (530 nm) and a red filter CFR0 (685 nm), where the numbers entered in parentheses denote the peak transmission wavelength of each filter, is provided from one pixel of the color liquid crystal display panel to another.

On the other hand, the white light, emitted by a three-wavelength CCFL, used as a light source for a backlight device of the color liquid crystal display apparatus, has a spectrum shown in FIG. 2, such that it contains light of different intensities in a variety of wavelengths.

Hence, the color reproduced by the combination of the backlight device, having such CCFL, emitting the light of three wavelength ranges, as light source, and the color liquid crystal display panel, having the color filter, described above, is rather poor in color purity.

FIG. 3 shows the color reproducing range of the color liquid crystal display apparatus, including the backlight device, having the above-described three-wavelength CCFL as a light source. Specifically, FIG. 3 depicts an xy chromaticity diagram of the XYZ color system, as prescribed by the Commission Internationale de l'Eclairage (CIE).

As may be seen from FIG. 3, the color reproducing range of the color liquid crystal display apparatus, having the backlight device, employing the CCFL as light source, is narrower than the color reproducing range provided for by the standard of the NTSC (National Television System Committee) system adopted as the color television broadcasting system. That is, the former color reproducing range may not be said to cope sufficiently with the current television broadcasting.

On the other hand, there is a fear that the CCFL, containing mercury in the phosphorescent tube, may have an ill effect on the environment. Hence, a demand is raised for a light source that may take the place of the CCFL as a light source of the backlight device. With the development of the blue light emitting diode, the light emitting diodes, emitting light of three prime colors, namely red light, green light and blue light, are now in order. Thus, with the use of the light emitting diodes as light source for the backlight device, the color light obtained by the color liquid crystal display panel may be improved in color purity, and hence it may be expected that the color reproducing range may be made as broad as or even broader than the color reproducing range provided for by the NTSC system.

DISCLOSURE OF THE INVENTION

Problems to be Solved by the Invention

In case the light emitting diodes are used as light source, color purity may be much higher than in case of using the CCFL, and hence the color reproducing range may be made broader significantly. On the other hand, the color purity may be affected significantly by characteristics of the color filter provided on the color liquid crystal display panel. For example, if a red filter CFR0, showing spectral characteristics shown in FIG. 1, is used, the desired luminance may be secured, however, the light color purity, required of the red light, is deteriorated to narrow down the color gamut. That is, with the color liquid crystal display apparatus, luminance and color purity are in a relationship of tradeoff to each other.

There is also a problem that the color reproducing range of the color liquid crystal display apparatus, employing a backlight device, including the light emitting diode as light source, is as yet not so broad as the color reproducing range provided for by the NTSC system.

In case the tristimulus light emitting diode is used, the color reproducing range mainly depends on the waveform range of the light emitting diode. For achieving a broader color gamut, it is likewise crucial to optimize the transmission wavelength band of the color filter provided on the color liquid crystal display panel so as to cope with the wavelength range of the light emitting diode. That is, the color purity of the image displayed on the color liquid crystal display apparatus is changed appreciably by the manner of matching between the light emitting diode, used as a light source, and the color filter, thus affecting the color reproducing range significantly. Hence, optimum designing of the light emitting diode as light source and the color filter represents a crucial factor in the realization of the broad color gamut.

In view of the above problems, it is an object of the present invention to provide a color filter for a color liquid crystal display panel with which the color gamut of a color liquid crystal display apparatus of the backlight system may be made broader, and a color liquid crystal display apparatus including a color liquid crystal display panel having this color filter.

It is another object of the present invention to provide a color liquid crystal display apparatus of the backlight system in which characteristics of the light emitting diode and the color filter may be optimized to allow for a broader color gamut.

The present invention provides a color filter of a transmissive color liquid crystal display panel, made up of a tristimulus color filter for wavelength-selecting and transmitting red light, green light and blue light. With the color filter of the present invention, overlaying of a transmission wavelength band of a red filter on a transmission wavelength band of a blue filter may substantially be precluded for preventing color mixing of blue and red colors.

The present invention also provides a color liquid crystal display apparatus including a transmissive color liquid crystal display panel, provided with a color filter, made up of a tristimulus filter for wavelength-selecting and transmitting red light, green light and blue light, and a backlight device for illuminating the color liquid crystal display panel with white light from its backside. With the color liquid crystal display apparatus of the present invention, overlaying of a transmission wavelength band of a red filter on a transmission wavelength band of a blue filter may substantially be precluded for preventing color mixing of blue and red colors.

The present invention also provides a color liquid crystal display apparatus including a transmissive color liquid crystal display panel, provided with a color filter, made up of a tristimulus filter for wavelength-selecting and transmitting red light, green light and blue light, and a backlight device for illuminating the color liquid crystal display panel with white light from its backside. The backlight device includes a light source and a color mixing means. The light source is made up of a red light emitting diode, emitting red light and having a peak wavelength $\lambda pr$ such that 640 nm$\leq\lambda pr\leq$645 nm, a green light emitting diode, emitting green light and having a peak wavelength $\lambda pg$ such that 525 nm$\leq\lambda pg\leq$530 nm, and a blue light emitting diode, emitting blue light and having a peak wavelength $\lambda pb$ such that 440 nm$\leq\lambda pb\leq$450 nm. The color mixing means mixes the red light, green light and blue light radiated from the light source to create the white light. The color filter is made up of a red filter, a green filter and a blue filter. The red filter has a peak wavelength of a transmission wavelength band Fpr such that 685 nm$\leq$Fpr$\leq$690 nm, with the transmission wavelength band of the red filter not substantially overlapping with a transmission wavelength band of the blue filter to prevent color mixing of blue and red colors. The green filter has a peak wavelength of a transmission wavelength band Fpg of 530 nm and the half-value width of a transmission wavelength band Fhwg such that 80 nm$\leq$Fhwg$\leq$100 nm. The blue filter has a peak wavelength of a transmission wavelength band Fpb such that 440 nm$\leq$Fpb$\leq$460 nm.

With the color filter, according to the present invention, overlaying of the transmission wavelength band of a red filter on the transmission wavelength band of a blue filter may substantially be precluded for preventing color mixing of blue and red colors. Hence, the red light transmitted through the red filter may be improved in color purity, with the result that the color liquid crystal display apparatus, provided with the color liquid crystal display panel, may be broader in color gamut.

With the color liquid crystal display apparatus, according to the present invention, the peak wavelength $\lambda pb$ of the blue light emitting diode, from among the red, green and red light emitting diodes, used as light source for the backlight device, is such that 440 nm$\leq\lambda pb$<460 nm, whereby the relationship between the spectral characteristics of the color filter and the peak wavelength of the blue light emitting diode is optimized to provide for a broad color gamut and optimum luminance.

In addition, with the color liquid crystal display apparatus, according to the present invention, in which characteristics of the red, green and blue filters, provided on the color liquid crystal display panel, and characteristics of the red, green and red light emitting diodes, provided on the backlight device, may be matched and optimized to each other, whereby the color reproducing range of a picture may be enlarged appreciably.

Other objects and specified advantages of the present invention will become more apparent from the following explanation of preferred embodiments thereof which will now be made conjunction with the drawings.

BEST MODE FOR CARRYING OUT THE INVENTION

Figure 1:
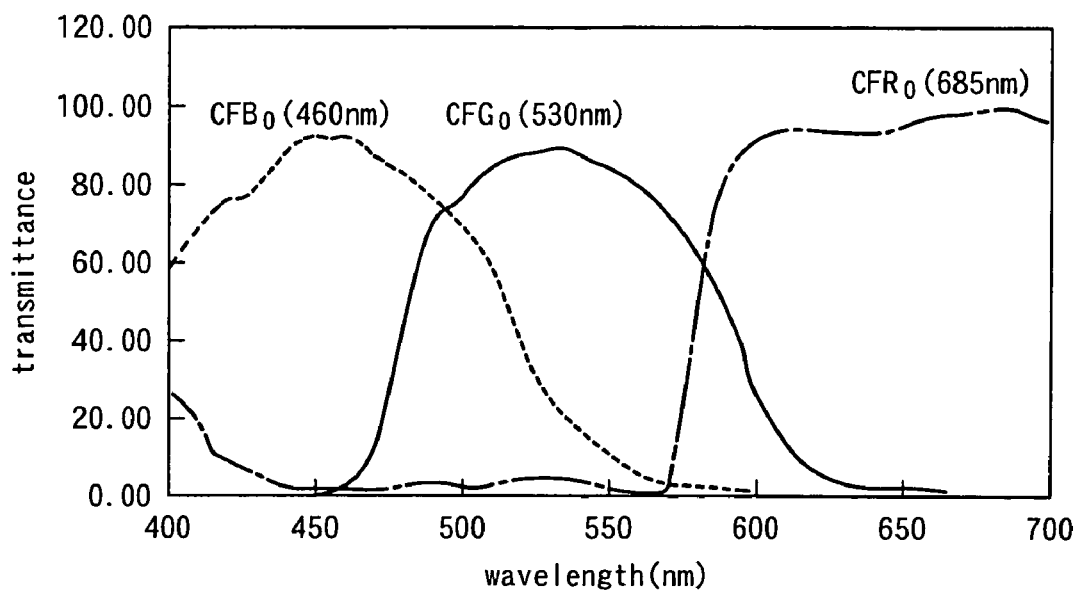
FIG. 1 is a graph showing spectral characteristics of a color filter of a color liquid crystal display panel provided on a conventional color liquid crystal display apparatus.
Figure 2:
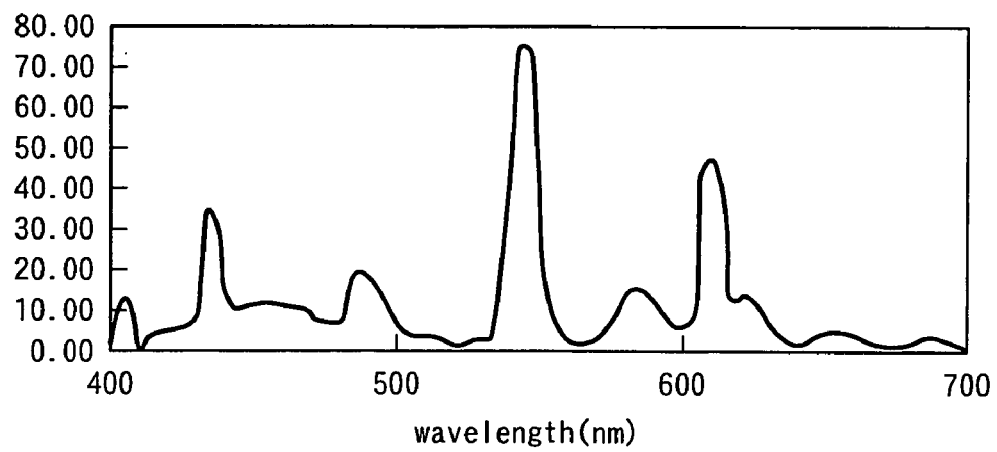
FIG. 2 is a graph showing the spectrum of a light source (CCFL) of the backlight device provided in the color liquid crystal display apparatus.
Figure 3:
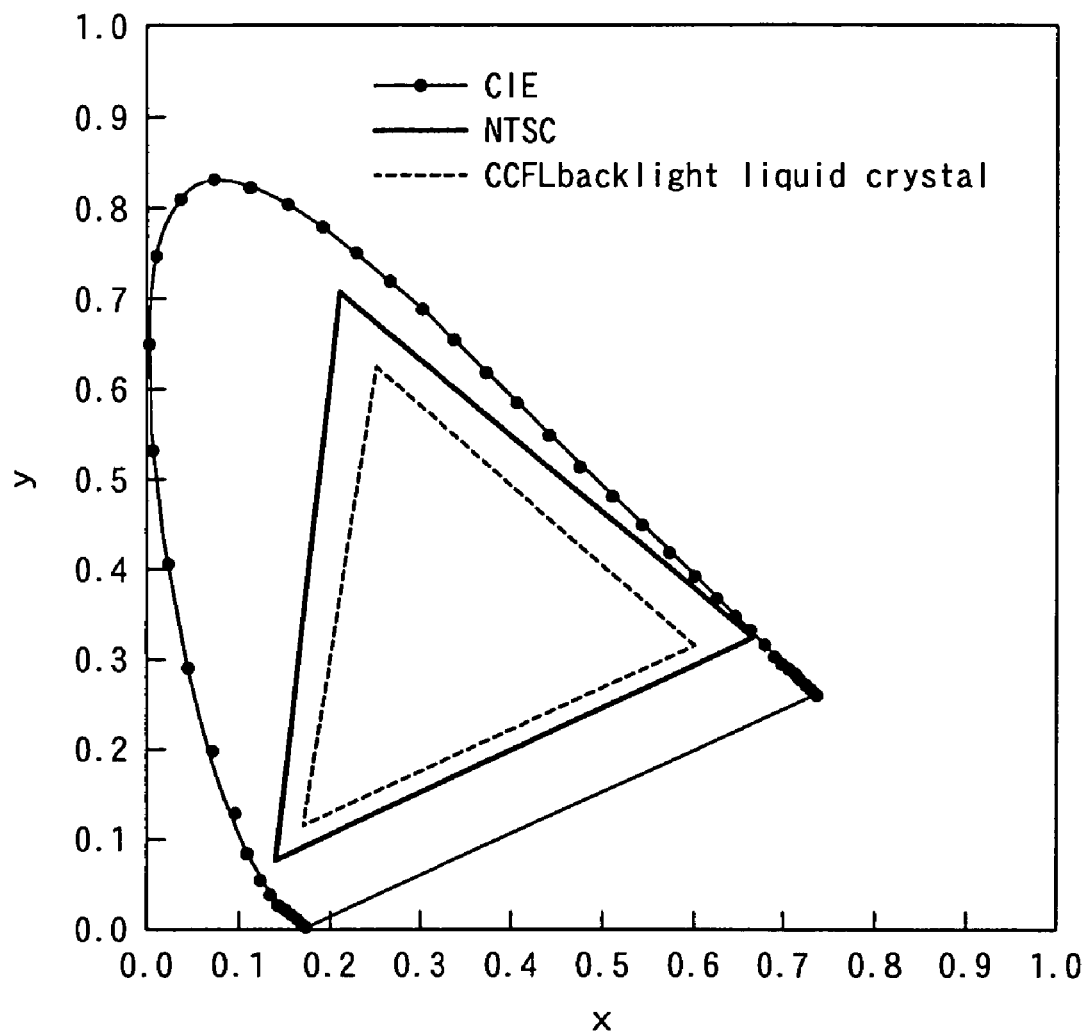
FIG. 3 is a graph showing the xy chromaticity diagram of the XYZ color system, in which there is additionally shown the color reproducing range of the conventional color liquid crystal display apparatus, employing the CCFL as light source for the backlight device.

Referring to the drawings, preferred embodiments of the present invention will be described in detail.

It should be noted that the present invention is not to be limited to the embodiments now explained and may be optionally modified without departing from the scope of the invention.

Figure 4:
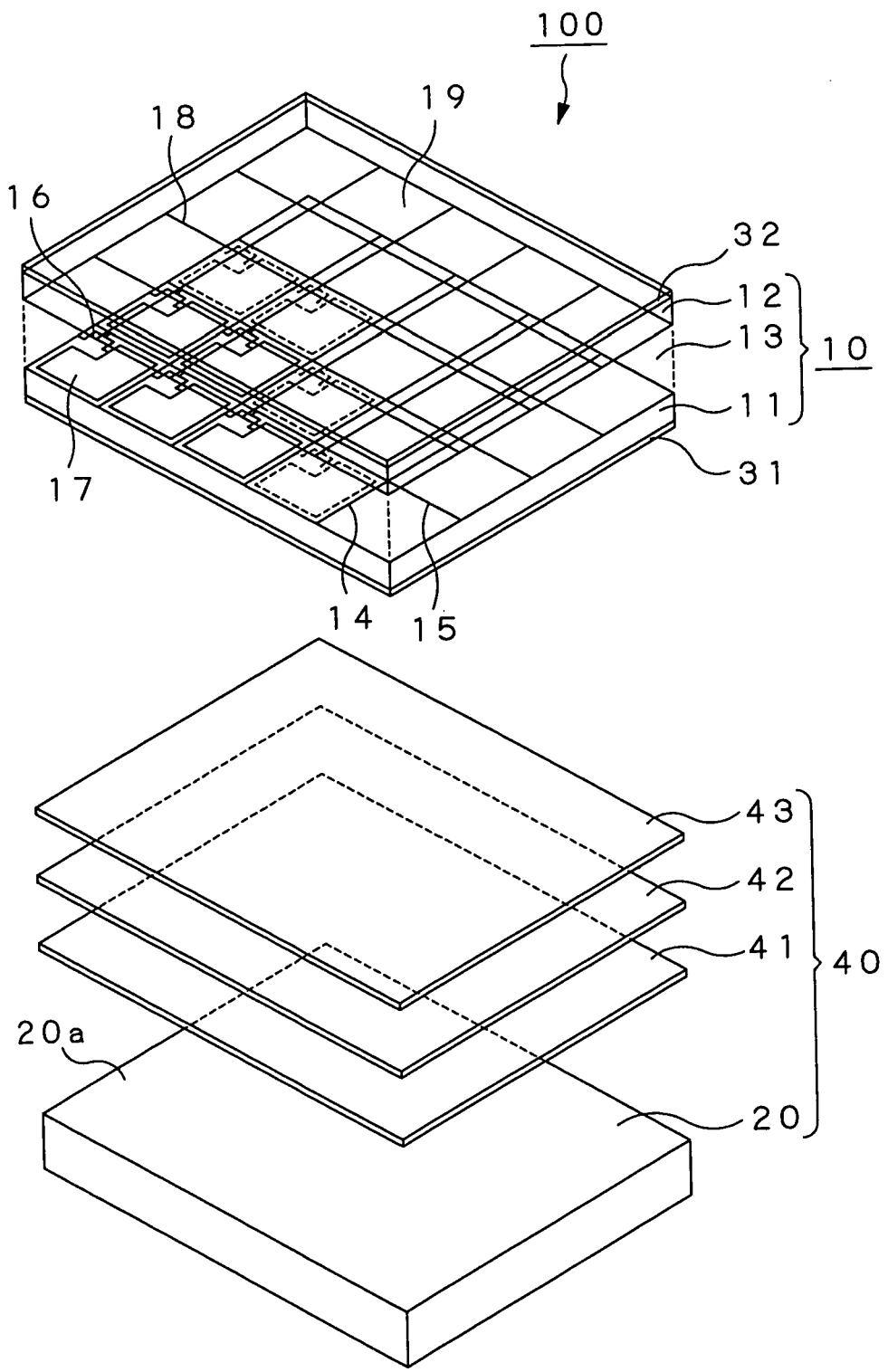
FIG. 4 is an exploded perspective view showing a color liquid crystal display apparatus embodying the present invention.

The present invention is applied to, for example, a color liquid crystal display apparatus 100 configured as shown in FIG. 4.

In this figure, the transmissive color liquid crystal display apparatus 100 is made up of a transmissive color liquid crystal display panel 10, and a backlight unit 40, provided on the backside of this color liquid crystal display panel 10. This transmissive color liquid crystal display apparatus 100 may be provided with a receiving unit, such as an analog tuner or a digital tuner, for receiving the ground wave or the satellite wave, a picture signal processing unit or an audio signal processing unit for processing picture signals or audio signals, received by this receiving unit, respectively, and an audio signal outputting unit, such as loudspeaker, for outputting audio signals processed by the audio signal processing unit, although these units are not shown.

The transmissive color liquid crystal display panel 10 is made up of two transparent substrates, formed by glass or the like (a TFT substrate 11 and a counter-electrode substrate 12), and a liquid crystal layer 13 of, for example twisted nematic (TN) liquid crystal, enclosed in a space between the two substrates. On the TFT substrate 11, there are formed signal lines 14 and scanning lines 15, arranged in a matrix configuration, as well as thin-film transistors 16, as switching elements, and pixel electrodes 17, arranged at the points of intersection of the signal lines 14 and the scanning lines 15. The thin-film transistors 16 are sequentially selected by the scanning lines 15 to write picture signals, supplied from the signal lines 14, in associated ones of the pixel electrodes 17. On the inner surface of the counter-electrode substrate 12, there are formed counter electrodes 18 and a color filter 19.

Figure 5:
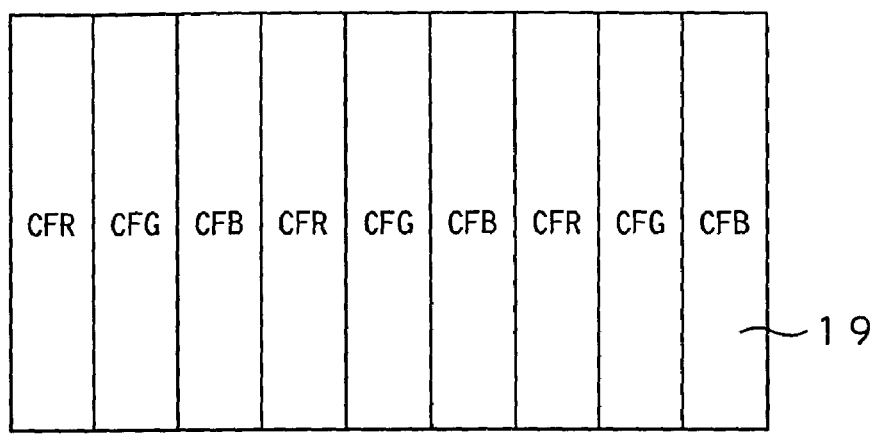
FIG. 5 is a plan view showing a color filter of a color liquid crystal display panel constituting a color liquid crystal display apparatus.

The color filter 19 will now be described. The color filter 19 is divided into a plural number of segments each associated with a pixel. For example, the color filter is divided into three segments, associated with three prime colors, that is, a red filter CFR, a green filter CFG and a blue filter CFB, as shown in FIG. 5. The arraying pattern for the color filter may be exemplified by delta array or square array, not shown, in addition to the striped array shown in FIG. 5. The color filter 19 will be described in detail subsequently.

With the transmissive color liquid crystal display apparatus 100, the transmissive color liquid crystal display panel 10 is sandwiched between a pair of polarizing plates 31, 32, and driven in accordance with an active matrix system, as white light is illuminated from its backside by the backlight unit 40, such as to display a desired full-color picture.

The backlight unit 40 illuminates the color liquid crystal display panel 10 from its backside. Referring to FIG. 4, the backlight device for color liquid crystal display 40 includes a backlight device 20, and a set of optical sheets, stacked on a light radiating surface 20a of the backlight device 20, such as a light diffusing sheet 41, a prism sheet 42 and a polarized light transforming sheet 43. The backlight device 20 mixes the light from the light sources to generate white light which is radiated by surface light emission from a light radiating surface 20a.

The set of optical sheets is made up of a plural number of sheets having the functions of resolving the incident light into mutually perpendicular polarized components, compensating the phase difference of light waves to assure a broad angle of visibility and of preventing coloration, diffusing the incident light and improving the luminance. The set of optical sheets is provided for transforming the light, radiated by surface light emission from the backlight device 20, into the illuminating light having optimum optical characteristics for illuminating the color liquid crystal display panel 10. Consequently, the set of optical sheets may include not only the light diffusing plate 41, prism sheet 42 or polarized light transforming sheet 43, but a variety of other optical sheets having other optical functions.

Figure 6:
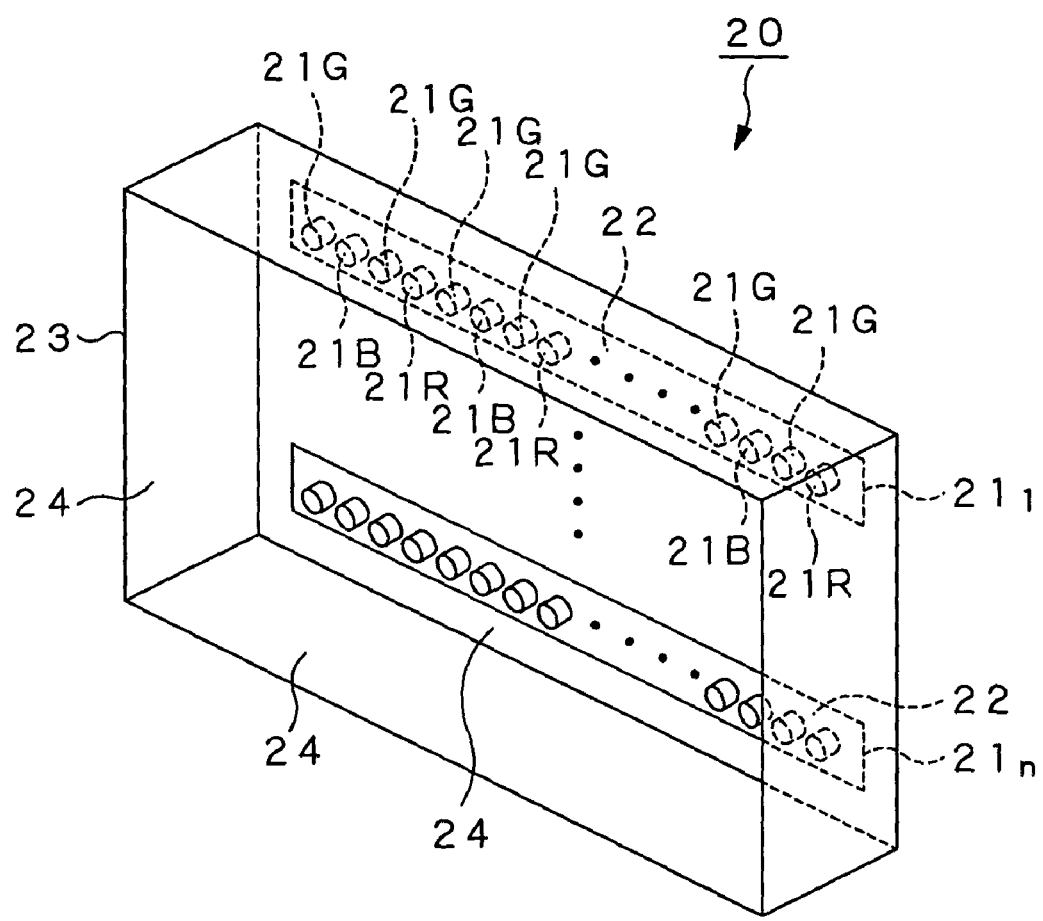
FIG. 6 is a perspective view showing a backlight device constituting a color liquid crystal display apparatus.

FIG. 6 depicts the configuration of the backlight device 20 in a schematic perspective view. Referring to FIG. 6, the backlight device 20 uses, as light sources, a red light emitting diode 21R, radiating red light, a green light emitting diode 21G, radiating green light, and a blue light emitting diode 21B, radiating blue light. In the following description, in case the red light emitting diode 21R, green light emitting diode 21G and the blue light emitting diode 21B are referred to generically, each light emitting diode is simply referred to as light emitting diode 21.

Referring to FIG. 6, a plural number of light emitting diodes 21 are arrayed in a line in a desired sequence to form a light emitting diode unit 21n, where n is a natural number. The sequence of arraying the light emitting diodes on a substrate 22 is such that plural green light emitting diodes 21G are arrayed at an equal distance from one another and plural red light emitting diodes 21R and blue light emitting diodes 21B are alternately arrayed in the interstices between the neighboring green light emitting diodes 21G, as shown in FIG. 6.

A plural number of the light emitting diode 21n are arrayed in a backlight housing 23, which is to be a backlight enclosure of the backlight device 20, depending on the size of the color liquid crystal display panel 10 adapted to be illuminated by the backlight unit 40.

The light emitting diode units 21n may be arrayed in the backlight housing 23 so that the longitudinal direction of the light emitting diode units 21n will be the horizontal direction, as shown in FIG. 6. Alternatively, the light emitting diode units 21n may be arrayed so that the longitudinal direction of the light emitting diode units 21n will be the vertical direction, in a manner not shown, or so that the longitudinal direction of the light emitting diode units 21n will be partly the horizontal direction and partly the vertical direction.

The technique of arraying the light emitting diode units 21n so that the longitudinal direction thereof will be the horizontal direction or the vertical direction is equivalent to that of arraying the fluorescent tubes so far used preferentially as light sources of the backlight device. Thus, the accumulated designing know-how may be used to reduce the cost or manufacture time.

The light beams, radiated from the red light emitting diode 21R, green light emitting diode 21G and the blue light emitting diode 21B, are mixed together in the backlight housing 23 to create white light. It should be noted that a lens, a prism or a reflective mirror, for example, is provided for each light emitting diode 21 so that the red light, green light and blue light, radiated from each light emitting diode 21, will be evenly mixed together in the backlight housing 23 to create radiated light of wide directivity.

Within the backlight housing 23, there are provided a diverter plate, not shown, having the color mixing function of mixing the light of the respective colors, radiated from the light emitting diodes 21, as light sources, to create white light suffering from only little color unevenness, and a diffusing plate for internal light diffusion for surface emission of white light radiated from the diverter plate.

The white light, generated on color mixing by the backlight housing 20, is illuminated to the color liquid crystal display panel 10 via the set of optical sheets described above.

Figure 7:
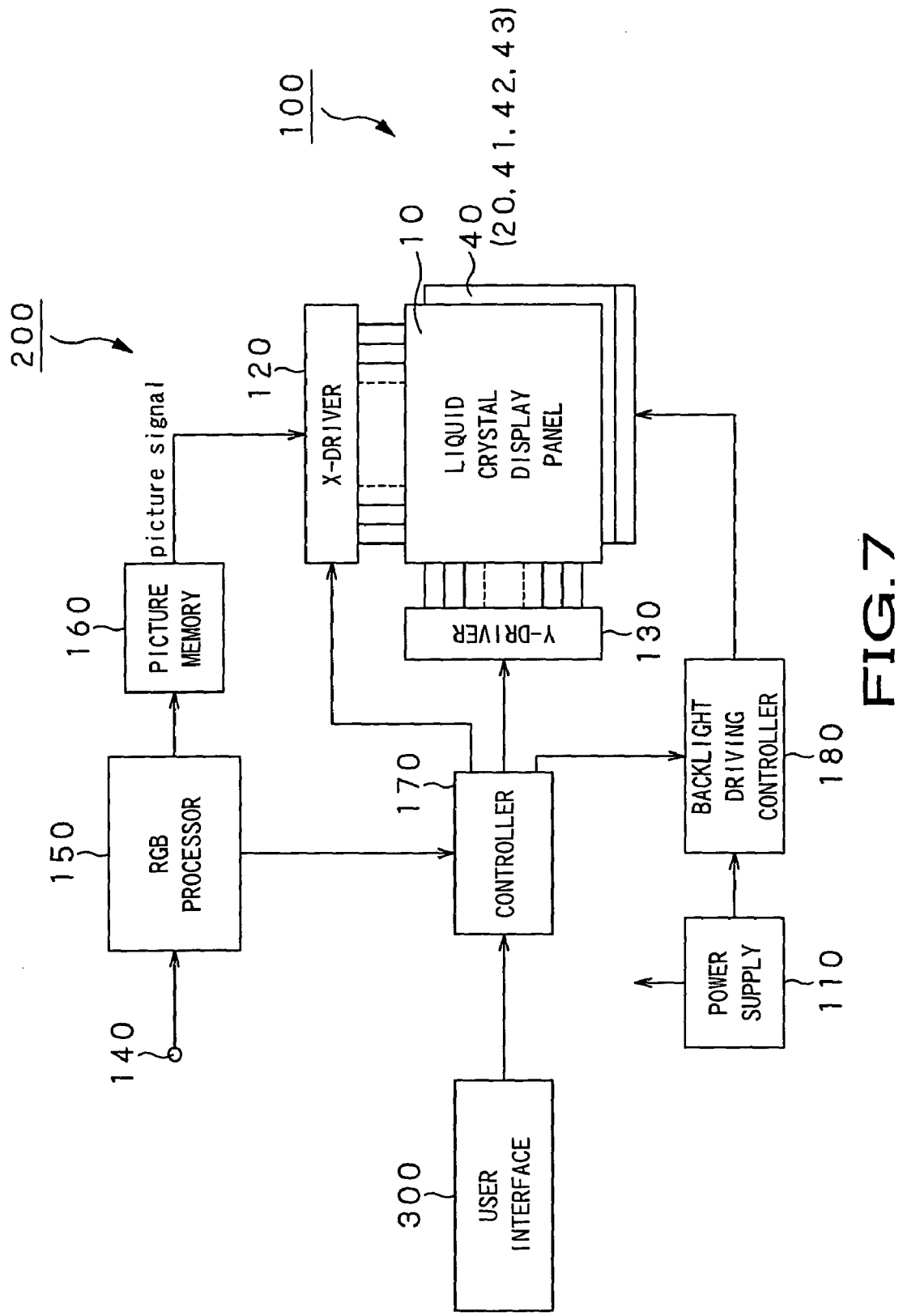
FIG. 7 is a block circuit diagram showing a driving circuit for driving a color liquid crystal display apparatus.

The color liquid crystal display apparatus 100 is driven by a driving circuit 200 shown for example in FIG. 7.

This driving circuit 200 includes a power supply unit 110 for supplying driving supply power for e.g. the color liquid crystal display panel 10 and the backlight device 20, and an X-driver circuit 120 as well as a Y-driver circuit 130 for driving the color liquid crystal display panel 10. The driving circuit also includes an RGB processor 150, supplied via an input terminal 140 with picture signals received by a receiver, not shown, of the color liquid crystal display apparatus 100, and which are processed by a picture signal processor. The driving circuit also includes a picture memory 160 and a controller 170, both connected to the RGB processor 150, and a backlight driving controller 180 for driving controlling the backlight device 20 of the backlight unit 40.

In this driving circuit 200, the picture signals, transmitted as input via input Terminal 140, are subjected to e.g. chroma processing, by the RGB processor 150, and converted from the composite signals into RGB separate signals, for convenience in driving the color liquid crystal display panel 10. The resulting signals are transmitted to the controller 170, while being transmitted via picture memory 160 to the X-driver circuit 120.

The controller 170 controls the X-driver circuit 120 and the Y-driver circuit 130, at a preset timing, as matched to the RGB separate signals, in order to drive the color liquid crystal display panel 10 by RGB separate signals, supplied via picture memory 160 to the X-driver circuit 120, so as to display a picture corresponding to the RGB separate signals.

The backlight driving controller 180 generates pulse-width modulated signal (PWM signal) from the voltage supplied from the power supply unit 110 to drive respective light emitting diodes 21 operating as light sources for the backlight device 20. In general, the color temperature of a light emitting diode depends on the operating current. Thus, if desired to faithfully reproduce the color (to render the color temperature constant) as desired luminance is procured, it is necessary to drive the light emitting diode 21, using the PWM signal, to suppress variations in color.

A user interface 300 is an interface for selecting a channel received by the aforementioned receiving unit, not shown, adjusting the volume of audio output from an audio output unit, not shown, and for adjusting the white balance or the luminance of white light from the backlight device 20 adapted for illuminating the color liquid crystal display panel 10.

For example, if the user has adjusted the luminance from the user interface 300, a luminance control signal is transmitted to the backlight driving controller 180 via controller 170 of the driving circuit 200. The backlight driving controller 180 is responsive to this luminance control signal to vary the duty ratio of the PWM signal for each of the red light emitting diode 21R, green light emitting diode 21G and the blue light emitting diode 21B to effect driving control of the red light emitting diode 21R, green light emitting diode 21G and the blue light emitting diode 21B.

The color liquid crystal display apparatus 100, configured as described above, enlarges the color reproducing range of a picture displayed on the color liquid crystal display panel 10 by matching, by way of optimization, the characteristics of the red filter CFR, green filter CFG and the blue filter CFB, provided on the color liquid crystal display panel 10, to those of the light emitting diodes 21R, 21G and 21B, provided on the backlight device 20.

Meanwhile, in a display device used for a computer monitor or a TV receiver, there are a variety of standards for the color reproducing range, as described above. In general, designing of the color filter 19 or selection of the light emitting diodes 21 is made in order to achieve the color reproducing range complying with one of these standards. In the color liquid crystal display apparatus 100, shown as an embodiment of the present invention, designing of the color filter 19 or selection of the light emitting diodes 21 is made to conform to a new color reproducing range, which is a further extension of the Adobe RGB standard, as the standard for the color reproducing range used in Photoshop, an application software product prepared by Adobe System Inc., by way of optimization.

The Adobe RGB standard provides a color reproducing range broader than the sRGB standard and, although it is not the international reference standard, it has been accepted as the de facto standards for business use, such as printing/publishing. This Adobe RGB standard has come to be applied by reason of increased demand for monitoring color reproduction of printed matter with the use of a large-sized display.

Figure 8:
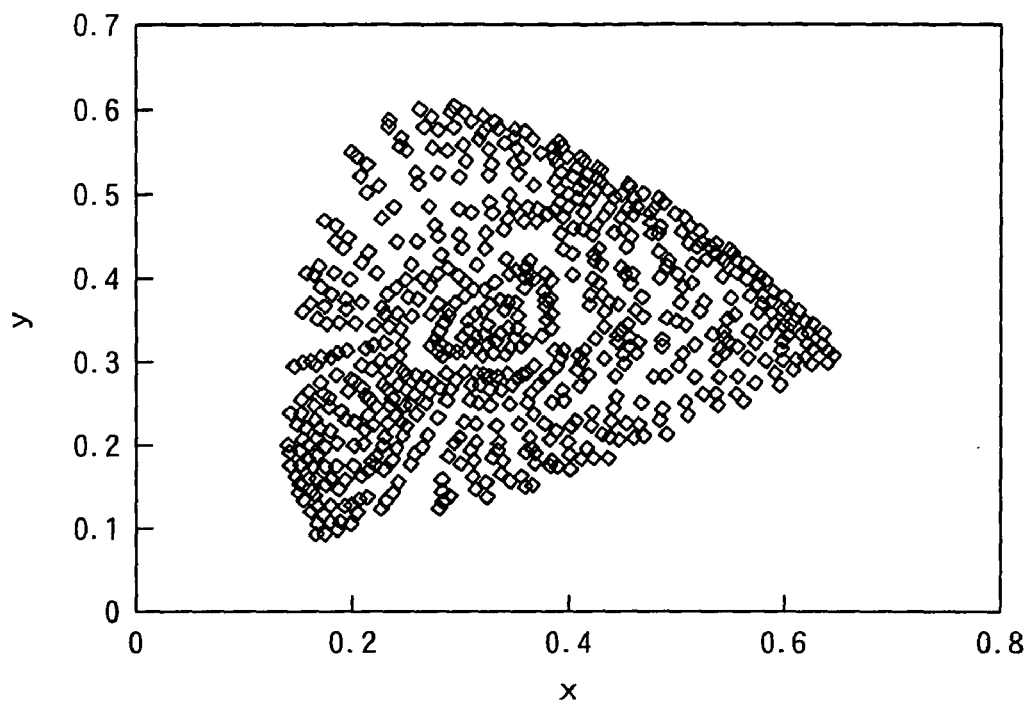
FIG. 8 is a graph showing the Pointer's Color.

FIG. 8 shows 786 colors of the Pointer's Color on an xy chromaticity diagram. The Pointer's Color, shown in FIG. 8, is a color chart which has extracted 786 surface colors existing in nature, on the basis of the Munsell color system (color chart). It may be said that this Pointer's Color, if expressed, is expressing substantially the totality of the colors that may be recognized by the human being.

Figure 9:
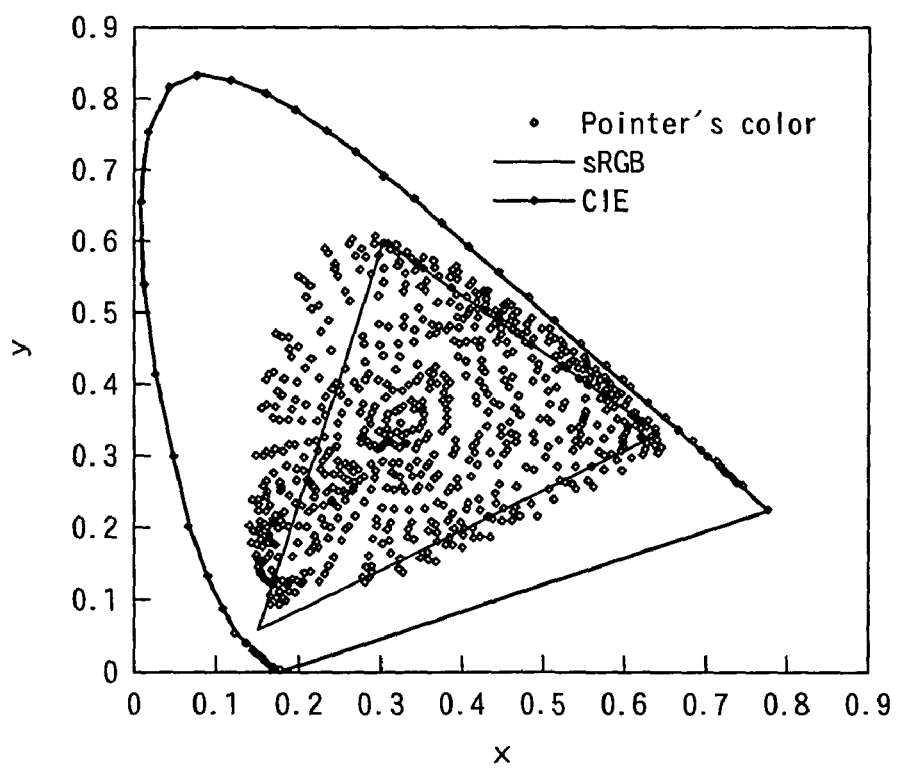
FIG. 9 is a graph showing the color reproducing range of the sRGB standard.

FIG. 9 is a chart showing how much the Pointer's Color shown in FIG. 8 is covered by the color reproducing range of the sRBG standard used conventionally in prescribing the color reproducing range of the display. In FIG. 9, there is also shown the XYX color system prescribed by the Commission Internationale de l'Eclairage (CIE). As may be seen from FIG. 9, the color reproducing range of the sRGB standard is appreciably narrower than that of the Pointer's Color. Calculations of to which extent the color reproducing range of the sRGB standard covers the Pointer's Color give a value equal to approximately 55%, meaning that the sRGB standard expresses only about 55% of actually existing colors.

Figure 10:
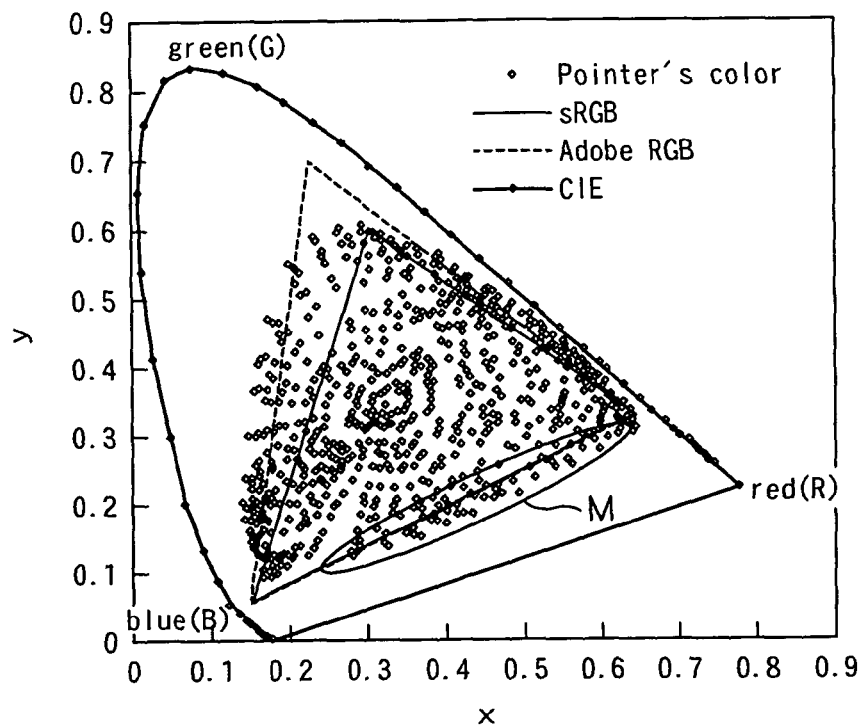
FIG. 10 is a graph showing the color reproducing range of the Adobe RGB standard.

FIG. 10 shows a chart corresponding to the chart of FIG. 9 added by the color reproducing range of the Adobe EGB standard. As may be seen from FIG. 10, the color reproducing range of the RGB standard substantially encompasses the Pointer's Color. Calculations of how much the color reproducing range of the Adobe RGB standard covers the Pointer's Color give a value equal to approximately 80%, meaning that the Adobe RGB standard expresses only about 80% of actually existing colors.

Figure 11:
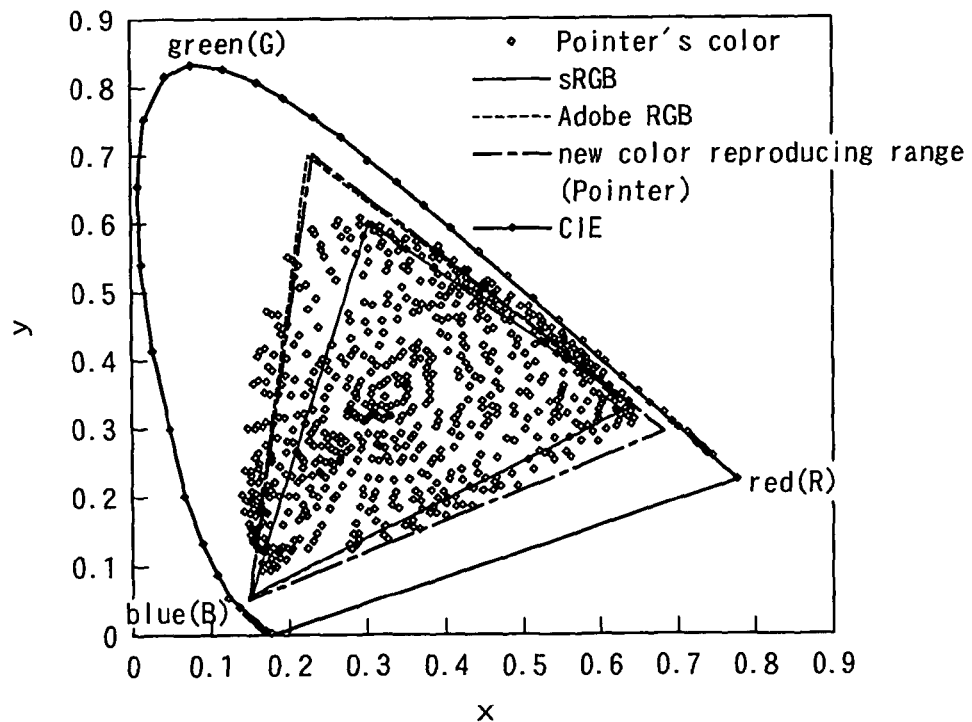
FIG. 11 is a graph showing the color reproducing range of the Pointer standard.

With the Adobe RGB standard, the Pointer's Color cannot be met, as shown in FIG. 10. In particular, the magenta region, centered about magenta (red purple color), which is one of three prime colors in artists' colors or printing ink and is a complementary color of green, cannot be covered. There is now proposed a standard which provides a new color reproducing range extending the Adobe RGB standard for complementing the magenta region, as shown in FIG. 11. The new color reproducing range, shown in FIG. 11, covers the Pointer's Color more extensively than the Adobe RGB standard. Calculations of how much the new color reproducing range covers the Pointer's Color give a value equal to approximately 90%. This new standard, providing the color reproducing range, which has extended the Adobe RGB, is termed the Pointer standard, because it approximately covers the Pointer's Color.

In the color liquid crystal display apparatus 100 embodying the present invention, it is attempted to optimize the picture, displayed on the color liquid crystal display panel 10, by designing the color filter 19 and selecting the respective light emitting diodes 21, so that the color reproducing range is such as satisfies this Pointer standard.

In the color liquid crystal display apparatus 100 embodying the present invention, it is necessary to maintain spectral intensity so that the white light radiated from the backlight device 20 corresponds to a desired color temperature to maintain the white balance.

For example, in the color liquid crystal display apparatus 100, the white balance of white light, radiated from the backlight device 20, is set so that its color temperature will be 10000±1000 K (Kelvin). In order for the color temperature of white light, radiated from the backlight device 20, to be 10000±1000 K, it is necessary to set the intensity ratio of the peak wavelengths of the red light, green light and blue light, emitted from the red light emitting diode 21R, green light emitting diode 21G and the blue light emitting diode 21B, respectively, not to 1:1:1, but to a preset ratio, changed from this simple ratio, and to maintain the so changed ratio at all times in case the characteristics of the light emitting diode 21 have been changed.

Figure 12:
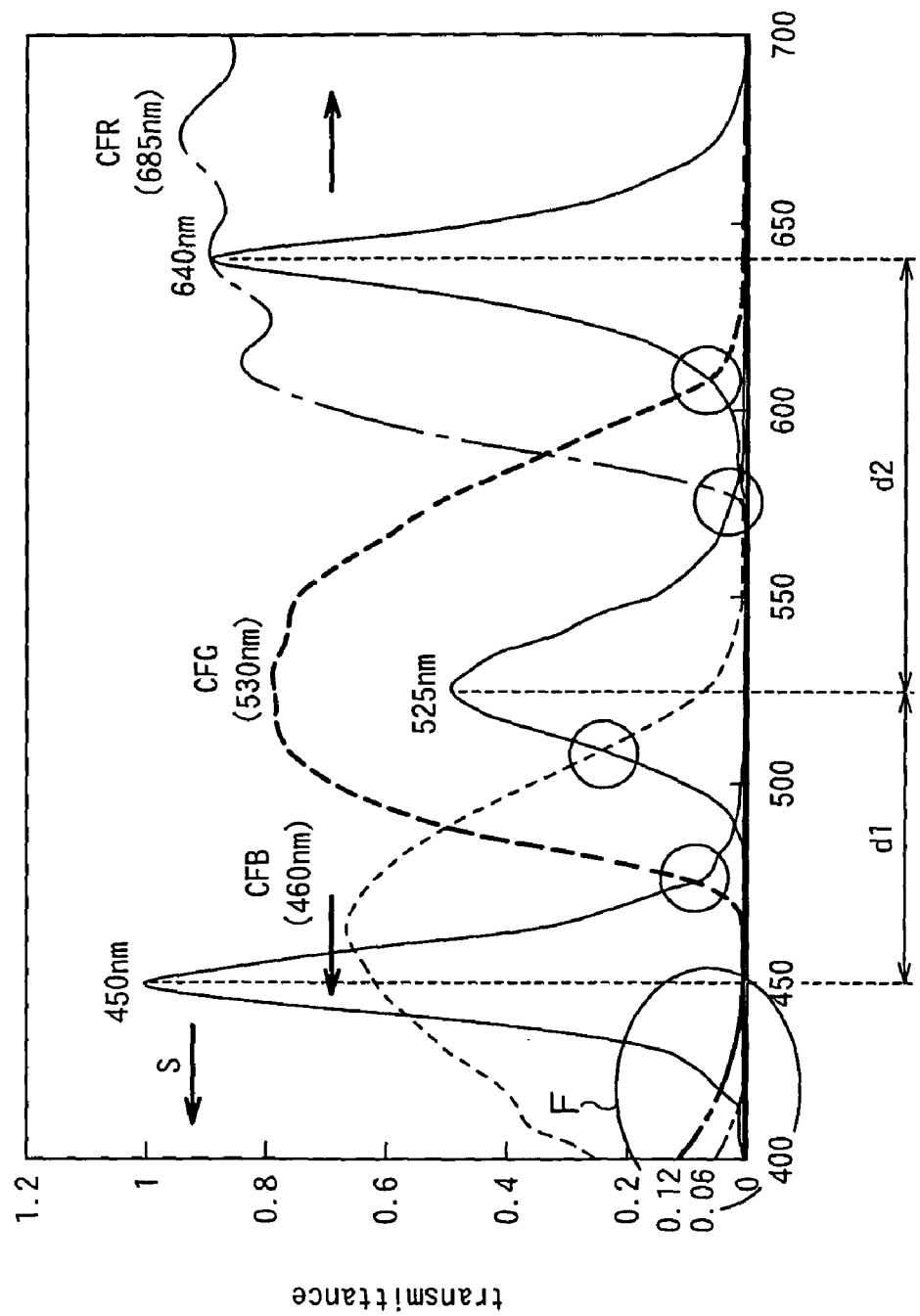
FIG. 12 is a graph showing spectral characteristics of a color filter, having the NTSC ratio of the order of 100%, and those of the light emitting diodes.

FIG. 12 shows spectral characteristics of a color filter 19 provided on the color liquid crystal display panel 10 of the color liquid crystal display apparatus 100 in case the color reproducing range is about equal to that of NTSC, that is, in case the NTSC ratio is approximately 100%. FIG. 12 also shows and corresponding spectral characteristics of the light emitting diode 21. The color reproducing range about equal to the NTSC ratio is broader than the color reproducing range of the aforementioned sRCB, however, is narrower than the color reproducing range of the Adobe RGB standard, to say nothing of the Pointer standard.

In the color liquid crystal display apparatus 100, embodying the present invention, the color reproducing range about the same as the NTSC ratio is used as a reference color reproducing range. Specifically, the color reproducing range is such that, in case the peak wavelengths of the red light emitting diode 21R, green light emitting diode 21G and the blue light emitting diode 21B are 640 nm, 525 nm and 450 nm, respectively, for the red filter CFR with the peak wavelength Fpr=685 nm, the green filter CFG with the peak wavelength Fpg=530 nm and for the blue filter CFB with the peak wavelength Fpb=460 nm, the NTSC ratio is approximately 100%, as shown in FIG. 12, Since extending this color reproducing range to the Pointer standard is tantamount to raising the color purity and providing for a broader color gamut, it becomes crucial to lower the crossing points of the spectra of respective color light beams, radiated from the light emitting diodes 21, and the transmission wavelength bands of the neighboring color filters 19, as indicated by circle marks in FIG. 12, and ultimately to reduce the crossing points to zero. This represents the fundamental designing concept.

If desired to lower the crossing points, the peak wavelength of the red light beam, radiated by the red light emitting diode, is ideally situated as close to the long wavelength side as possible, with the peak wavelength of the green light, radiated by the green light emitting diode, as center, to inhibit transmission of the red light beam through the green filter CFG. On the other hand, the peak wavelength of the blue light beam, radiated by the blue light emitting diode 21B, is ideally situated as close to the short wavelength side as possible, to inhibit transmission of the green light beam through the green filter CFG. The crossing points may similarly be lowered by narrowing the half-value width of the green filter CFG to narrow its transmission wavelength band.

Figure 13:
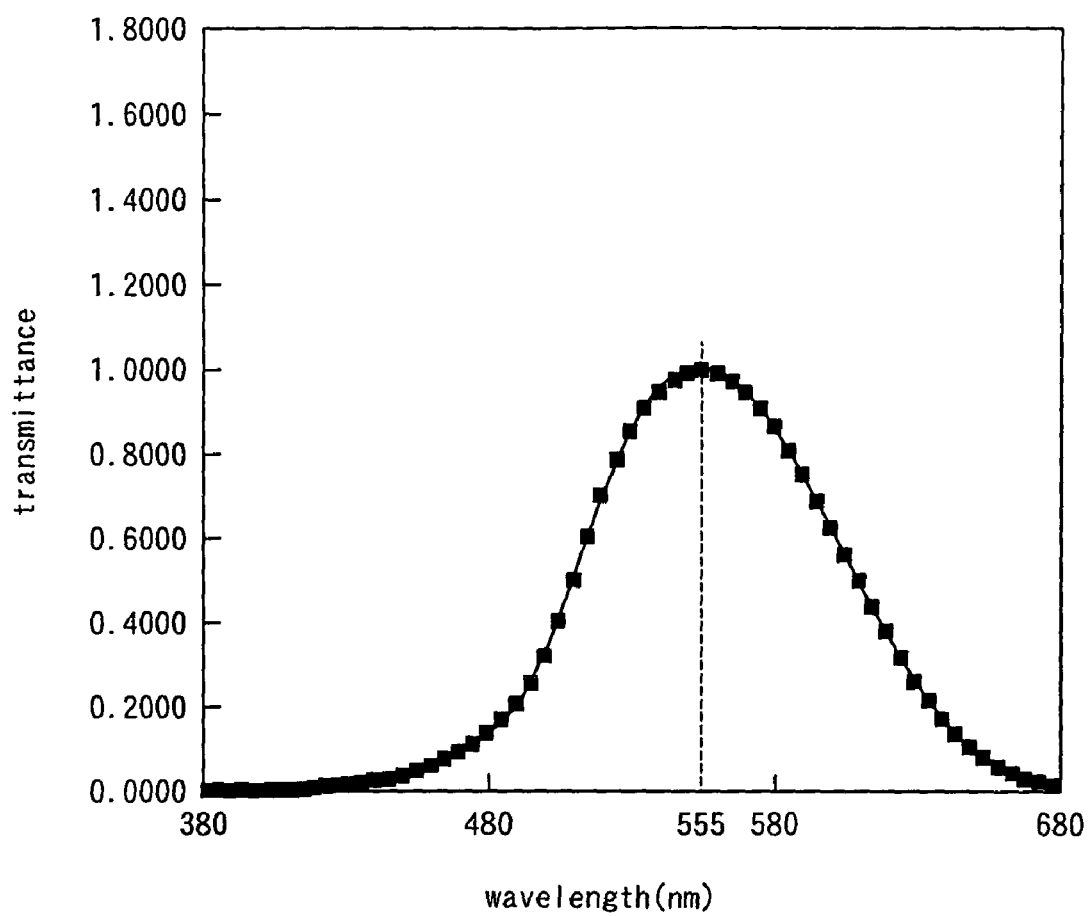
FIG. 13 is a graph for illustrating the visibility.

However, the sensitivity to light of the human eye (visibility) differs with wavelengths, such that it reaches a peak value at 555 nm, becoming lower towards the long wavelength side and towards the short wavelength side, as shown in FIG. 13. In this figure, a visibility curve is shown, in which transmittance for 555 nm, which is at a peak value, is normalized to unity (1).

Thus, if the peak wavelength of red light, radiated from the red light emitting diode 21R, and that of the blue light, radiated from the light emitting diode 21B, are shifted excessively towards the long wavelength side or towards the short wavelength side, respectively, or the half-value width of the green filter CFG is reduced excessively, an extremely high power would be needed to raise the visibility which has once been lowered.

With this in view, the peak wavelength of red light, radiated from the red light emitting diode 21R, and that of the blue light, radiated from the light emitting diode 21B, may be shifted towards the long wavelength side and towards the short wavelength side, respectively, or the half-value width of the green filter CFG may be reduced, in order to narrow the transmission wavelength band of the green filter CFG such as to raise color purity to yield the desired color reproducing range, and such as to widen the color gamut.

If, as the light emission intensity of each light emitting diode 21 is maintained to maintain the desired proper white balance, the color reproducing range of the color liquid crystal display apparatus 100 is to be enlarged to the Pointer standard, based on the aforementioned fundamental designing concept, the following concrete technique may now be proposed.

It is noted that, in the technique, now described, the display light, radiated from the color liquid crystal display panel 10 of the color liquid crystal display apparatus 100, is measured with a calorimeter for all color gamuts.

EXAMPLE 1

Example in Which the Peak Wavelength λpb of the Blue Light Emitting Diode 21B is Shifted Towards the Short Wavelength Side As described above, in case the peak wavelength λpb of the blue light emitting diode 21B is shifted towards the short wavelength side, the crossing point with the transmission wavelength band of the green filter CFG is lowered, and hence the color reproducing range becomes broader.

However, the red filter CFR exhibiting a certain value of transmittance in a wavelength region F in the vicinity of 400 nm to 450 nm of the wavelength of the transmission wavelength band of the blue filter CFB, as shown in FIG. 12, is obstructive in raising color purity or in providing for a broader color gamut. For example, if the amount of light transmission of the red filter CFR is gradually increased from 450 nm towards 400 nm until the red filter has the transmittance of approximately 12% at the wavelength of 400 nm, the respective colors are deteriorated in color purity as a result of color mixing of the blue color light transmitted through the blue filter CFB and the red color light transmitted through the red filter CFR to interfere with enlarging the color gamut, as shown in FIG. 12. This will now be verified.

It is assumed that the spectral characteristics of the color filter 19 are such that, in the wavelength region F in the vicinity of 400 nm to 450 nm of the transmission wavelength band of the blue filter CFB, the value of transmittance of red filter CFR is not zero, as shown in FIG. 12. This color filter 19 is referred to below as a color filter 19Z. It is also assumed that the peak wavelengths of the red light, green light and blue light, radiated by the red light emitting diode 21R, green light emitting diode 21G and the blue light emitting diode 21B, as light sources of the backlight device 20, respectively, are set so that λpr=640 nm, λpg=525 nm and λpb=450 nm, in keeping with the spectral characteristics of the color filter 19Z shown in FIG. 12.

If the peak wavelengths of the light emitting diodes 21 are selected as described above, a distance d1 between the peak wavelength of the blue light and that of the green light, as compared to a distance d2 between the peak wavelength of the red light an that of the green light, is such that d1<d2, that is, the distance d1 is narrower than the distance d2. Thus, color mixing between the blue light and the green light tends to be produced, such that color purity is worsened, and hence the color gamut cannot be made broader.

It is now contemplated to use a blue light emitting diode 21B, in which the peak wavelength λpb of the emitted blue light has been shifted to the side of a shorter wavelength, that is, in the direction indicated by arrow S in FIG. 12, to a side shorter in wavelength than 450 nm, by way of changing the wavelength band. With the use of such blue light emitting diode 21B, the distance d1 becomes broader, so that color mixing between the blue light and the green light is less liable to be produced, with the result that the color purity is improved, while the color gamut may be made broader.

In order that this may be verified, the color gamut in case the peak wavelength of the blue light emitting diode 21B has been shifted with respect to the color filter 19Z having spectral characteristics shown in FIG. 12 is measured, and the peak wavelength, thus obtained, is compared to the color gamut prior to shifting the peak wavelength. Specifically, the peak wavelengths of the red light emitting diode 21R and the green light emitting diode 21G are fixed, and several samples of the blue light emitting diode 21B with respective different peak wavelengths are provided. The color gamuts of the color filters, made up of these three sorts of the light emitting diodes, were measured as those blue light emitting diode samples were interchanged.

Figure 14:
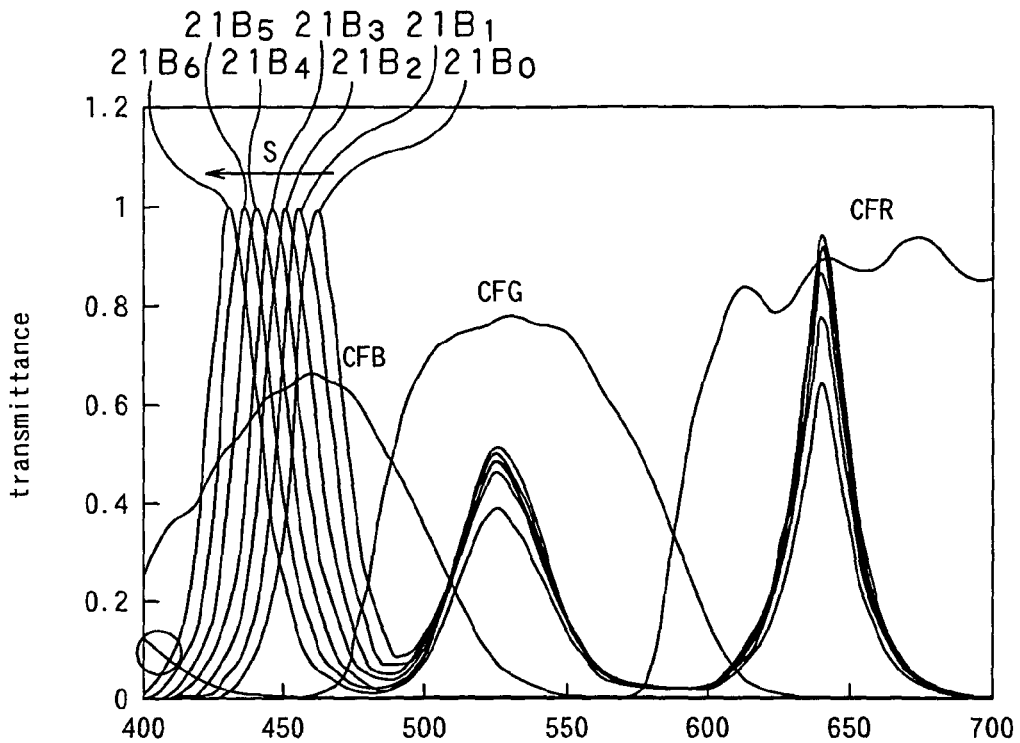
FIG. 14 is a graph showing spectral characteristics of a color filter and the spectra of light emitted by each light emitting diode in case the peak wavelength of the blue light emitting diode is varied.

FIG. 14 depicts a chart showing spectral characteristics of the color filter 19Z, also shown in FIG. 12, and wavelength spectra of the red light, green light and blue light, radiated from the red light emitting diode 21R, green light emitting diode 21G and the blue light emitting diode 21B, respectively. It is noted that seven blue light emitting diodes 21BN with the peak wavelengths of (460−5N) nm (N=0, 1, 2, . . . , 5, 6) were provided as the samples of the blue light emitting diodes 21B.

Meanwhile, in FIG. 14, measurement is carried out beginning from the blue light emitting diode sample 21B of the peak wavelength λpb=460 nm, longer than 450 nm, in order that the effect of shifting the peak wavelength λpb of the blue light emitting diode 21B towards the short wavelength side will be demonstrated more clearly.

Figure 15:
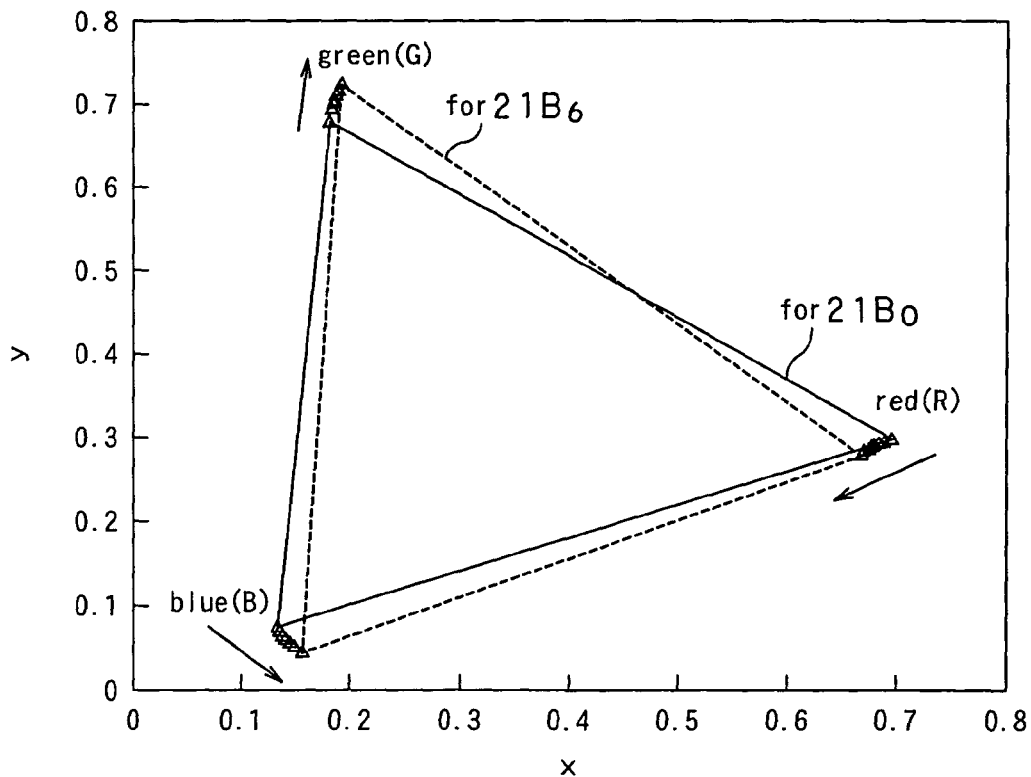
FIG. 15 is a graph showing the color gamut after the peak wavelength has been changed and the color gamut before the peak wavelength is changed, for the case where the peak wavelength of the blue light emitting diode is varied.

FIG. 15 shows the results of the color gamut in case of using the blue light emitting diodes 21BN with the peak wavelengths of (460−5N) nm. As may be seen from FIG. 15, the color gamut becomes broader than the pre-shift color gamut, on the green (G) and blue (B) sides, as the peak wavelength of the blue light emitting diodes 21BN is shifted towards the shorter wavelength side. Conversely, the color gamut on the red (R) color side, expected to become broader than the pre-shift color gamut as the peak wavelength of the blue light emitting diode 21BN is shifted towards the short wavelength side, has become narrower. Specifically, the color gamut has become narrowest with the use of the blue light emitting diode 21B6 with the peak wavelength λpb=430 nm.

Based on the above results, the color gamut in case the peak wavelength of the blue light emitting diode 21B has been shifted in the same way as described above, for a color filter 19A, the spectral characteristics of which are such that transmittance of the red filter CFR is set to zero in the wavelength range F of 400 to 450 nm as shown in FIG. 12, was measured and compared to the color gamut prior to shifting the peak wavelength.

Figure 16:
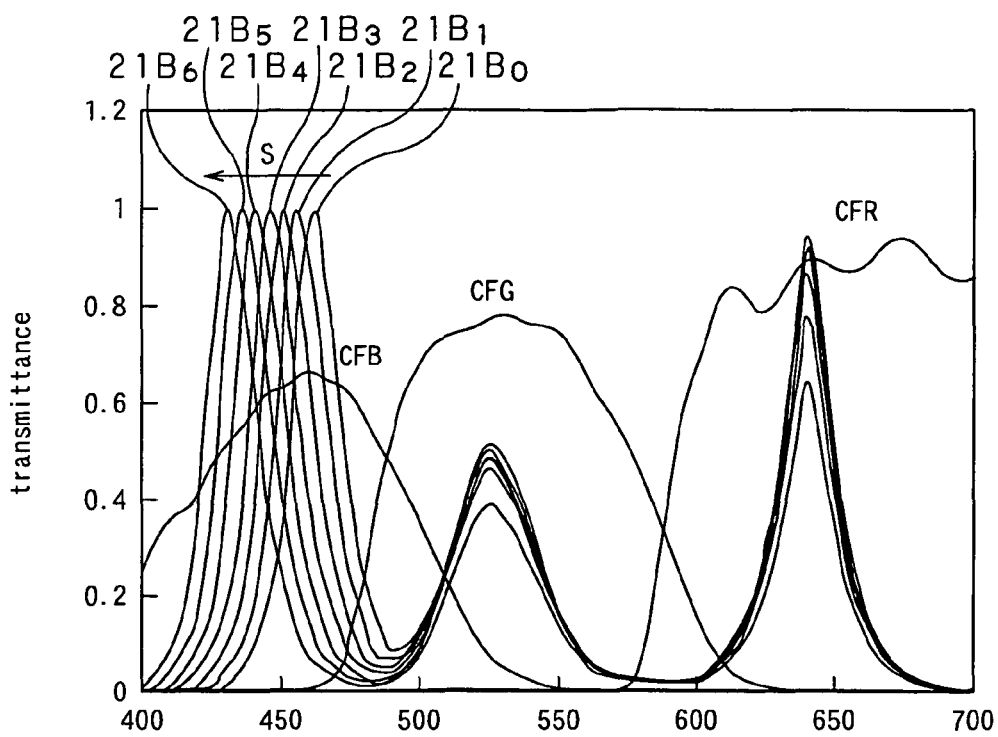
FIG. 16 is a graph showing spectral characteristics of the color filter and the spectra of light emitted by respective light emitting diodes, for the case where the peak wavelength of the blue light emitting diode is varied.

FIG. 16 depicts a chart showing spectral characteristics of the color filter 19A, and wavelength spectra of the red light, green light and blue light, radiated from the red light emitting diode 21R, green light emitting diode 21G and the blue light emitting diode 21B, respectively. It is noted that seven blue light emitting diodes 21BN with the peak wavelengths of (460−5N) nm (N=0, 1, 2, . . . , 5, 6) were provided as the samples of the blue light emitting diodes 21B.

Meanwhile, in FIG. 16, as in FIG. 14, measurement is carried out beginning from the blue light emitting diode sample 21B of the peak wavelength λpb=460 mm, longer than 450 nm, for more clearly demonstrating the effect of shifting the peak wavelength λpb of the blue light emitting diode 21B towards the short wavelength side.

Figure 17:
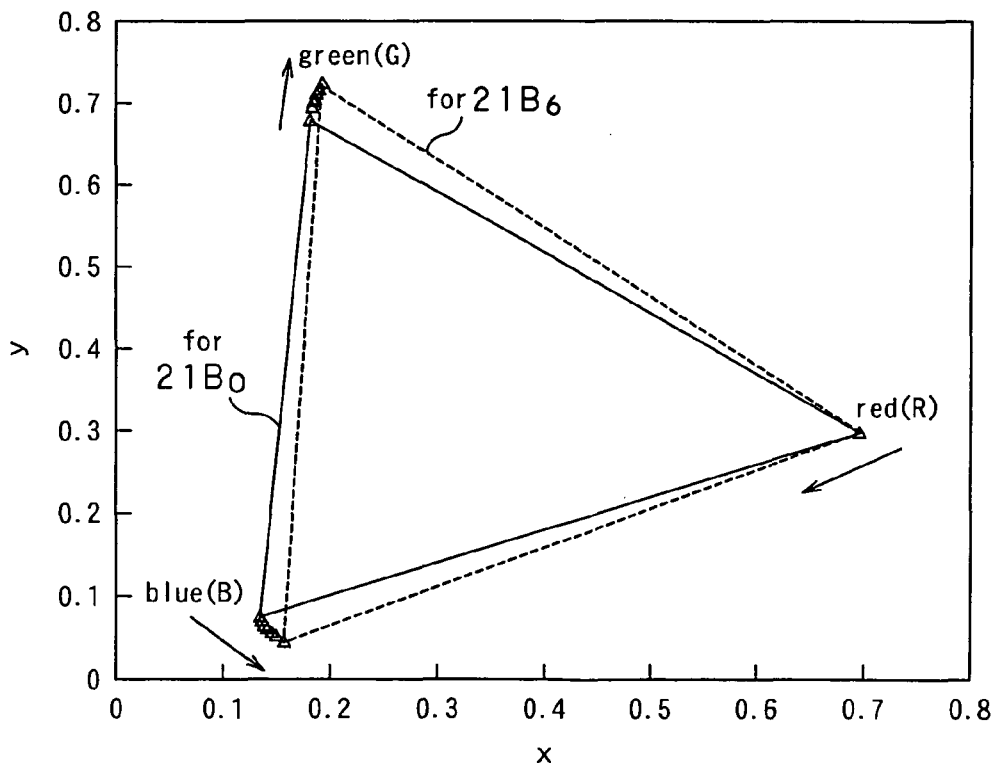
FIG. 17 is a graph showing the color gamut after the peak wavelength has been changed and the color gamut before the peak wavelength is changed, for the case where the peak wavelength of the blue light emitting diode is varied.

FIG. 17 shows the results of the color gamut in case of using the blue light emitting diodes 21BN with the peak wavelengths of (460−5N) nm. It may be seen from FIG. 15 that the color gamut becomes broader than the pre-shift color gamut, on the green (G) and blue (B) sides, as the peak wavelength of the blue light emitting diodes 21BN is shifted towards the shorter wavelength side. As for the color gamut of the red (R) color side, since the chromaticity point is not shifted in the decreasing direction, the color gamut is not narrowed so severely with shift of the peak wavelength of the blue light emitting diodes 21BN towards the short wavelength side, in a manner distinct from the case of FIG. 15. Specifically, the color gamut becomes broadest with the use of the light emitting diode 21B6 having the peak wavelength λpb=430 nm.

The results shown in FIG. 15 reflect the fact that, since the red filter CFR exhibits transmittance in the transmission wavelength band of the blue filter CFB, shown as a wavelength range F of the color filter 19Z, having spectral characteristics shown in FIG. 12, the red light transmitted through the red filter CFR is lowered in color purity. The results shown in FIG. 17 indicate the fact that, with the use of the color filter 19A, having the zero transmittance of the red filter CFR for the wavelength range F of the color filter 19Z having the spectral characteristics shown in FIG. 12, the light incident on the red filter CFR is not transmitted through the red filter CFR in the same wavelength range as the transmission wavelength band of the blue filter CFR, with the consequence that the red light transmitted through the red filter CFR becomes higher in color purity to moderate the above problem.

Figure 18:
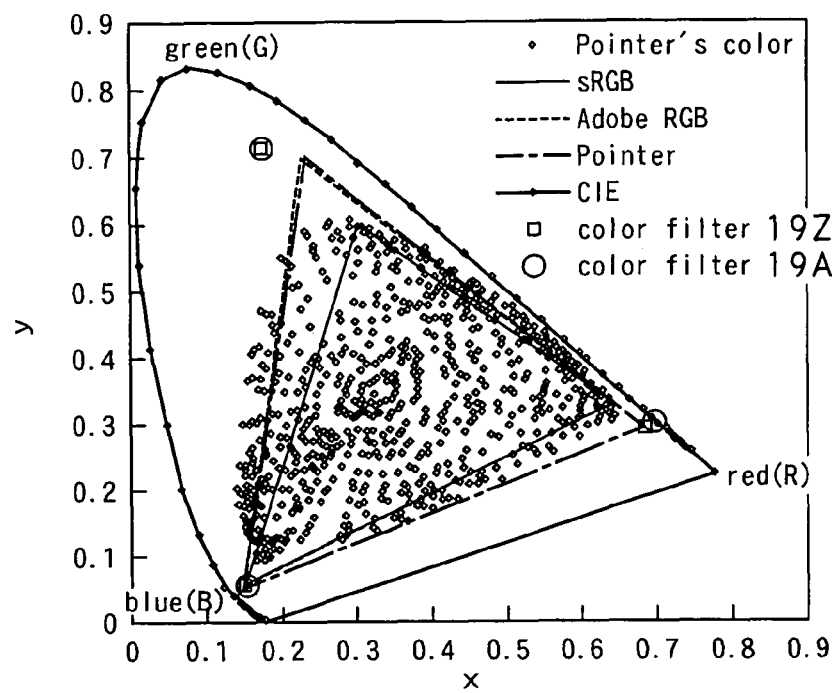
FIG. 18 is a graph showing the color reproducing range in case the color filter has been improved.
Figure 19:
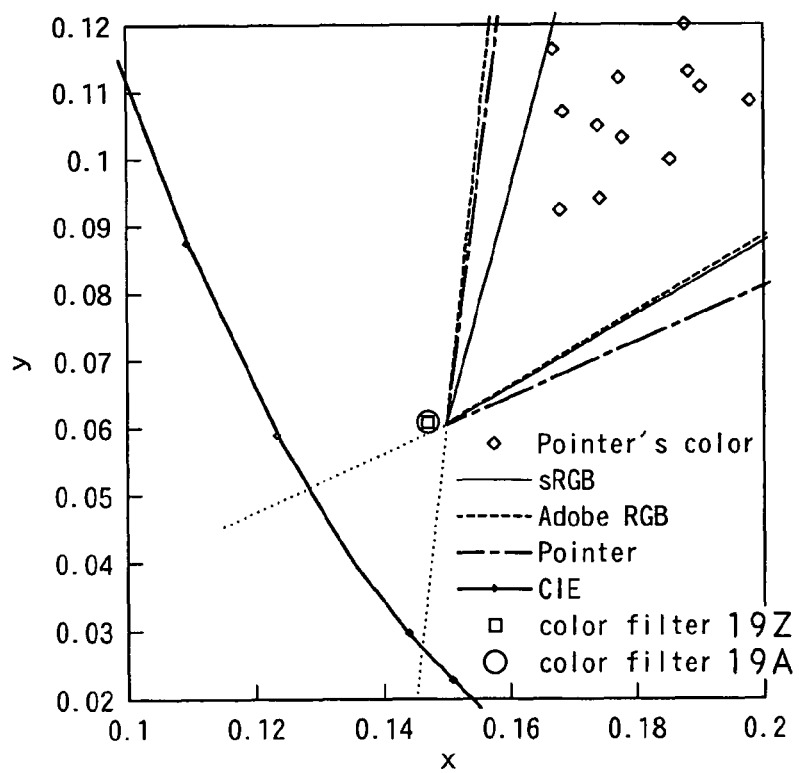
FIG. 19 is a graph showing the color gamut of the blue (B) region in case the color filter has been improved.
Figure 20:
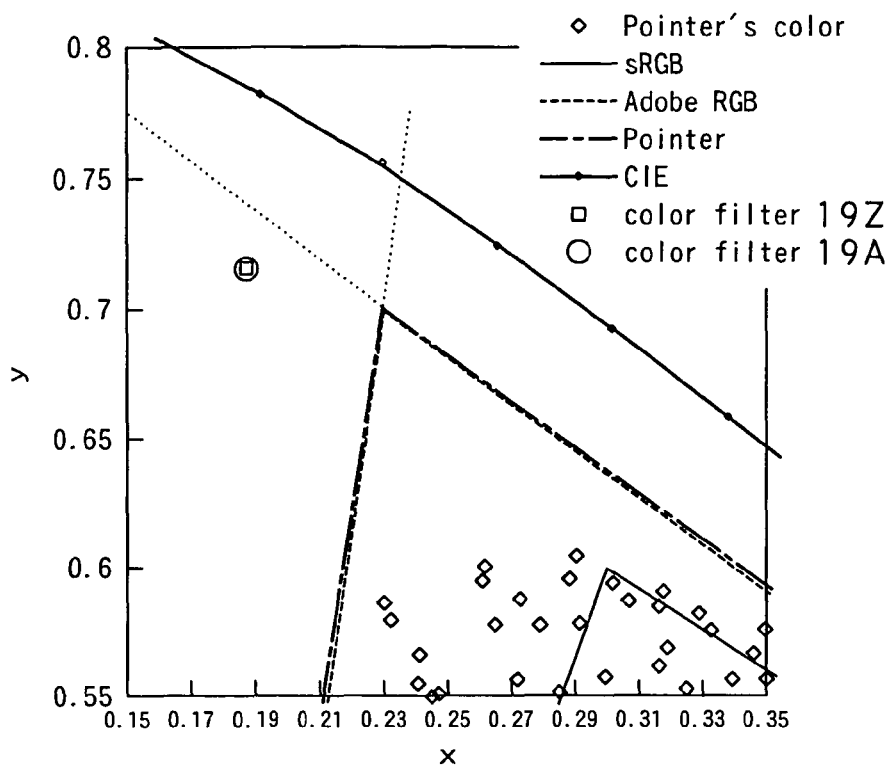
FIG. 20 is a graph showing the color gamut of the green (G) region in case the color filter has been improved.
Figure 21:
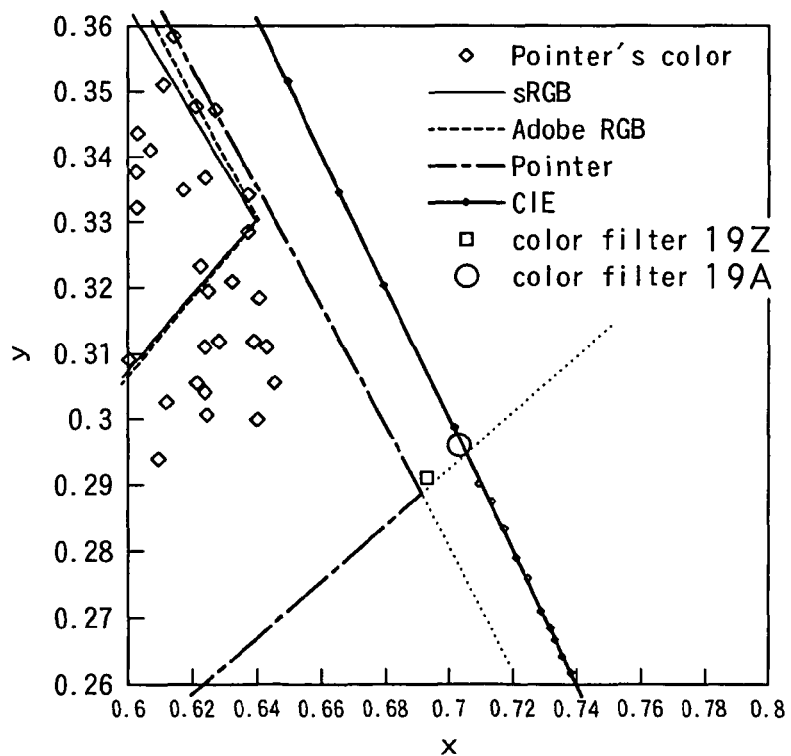
FIG. 21 is a graph showing the color gamut of the red (R) region in case the color filter has been improved.

In FIG. 18, chromaticity points are plotted in the xy chromaticity diagram for verifying how much the chromaticity points have been improved in the respective regions of red (R) color, green (G) color and blue (B) color, in case of using the blue light emitting diode 21B having the peak wavelength λpb=450 nm. FIGS. 19 to 21 illustrate the regions of the red (R) color, green (G) color and the blue (B) color to an enlarged scale, respectively. Meanwhile, in the xy chromaticity diagrams of FIGS. 18, 19, 20 and 21, there are also shown the Pointer's Color, the color reproducing range of the sRGB standard, the color reproducing range of the Adobe RGB standard, the color reproducing range of the Pointer standard and the XYZ color system prescribed by the Commission Internationale de l'Eclairage (CIE).

As may be seen in detail from FIGS. 19 to 21, there are no changes in the chromaticity points in the regions of blue (B) color and green (G) color, however, in the region of the red (R) color, the chromaticity points have become broader than in the Pointer standard, thus testifying to improvement. On the other hand, if the color filter 19Z is used, the chromaticity points are substantially the same in the red (R) region as those provided for in the Pointer standard.

Figure 22:
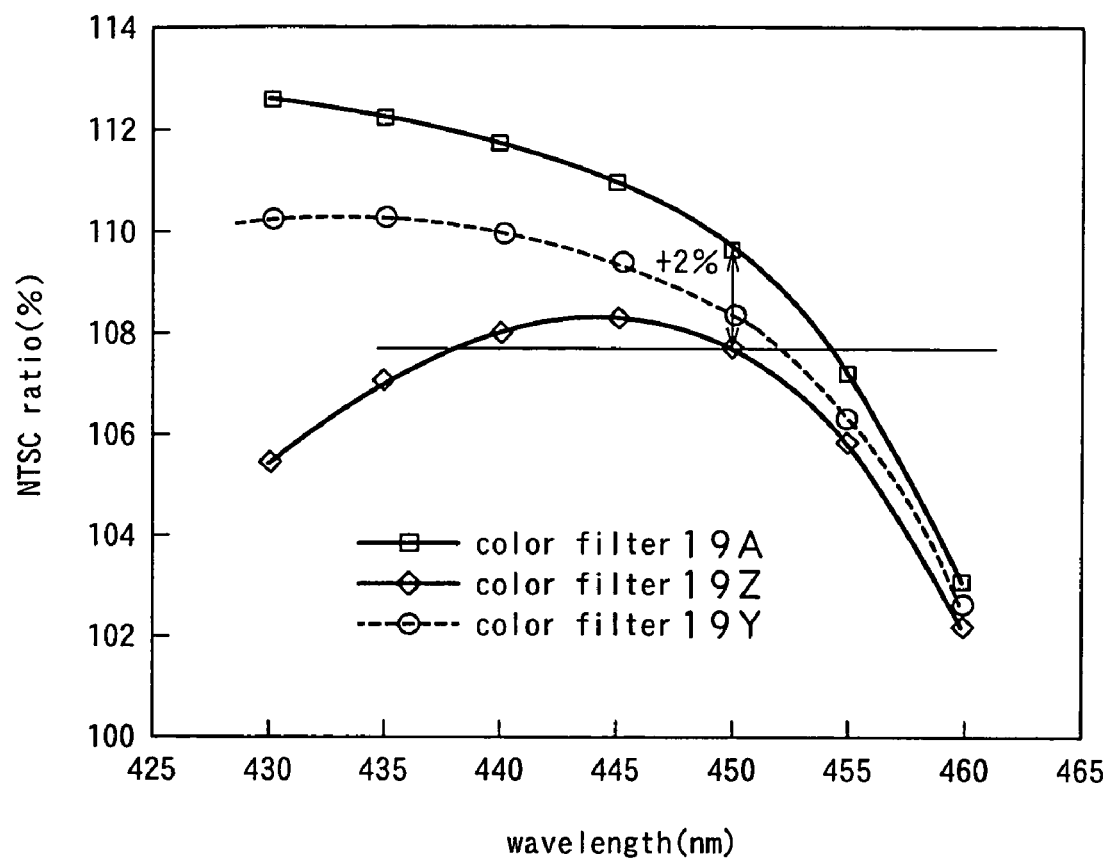
FIG. 22 is a graph showing the measured results of FIG. 17 in terms of the dependency of the NTSC ratio on the wavelength of the blue light emitting diode.
Figure 23:
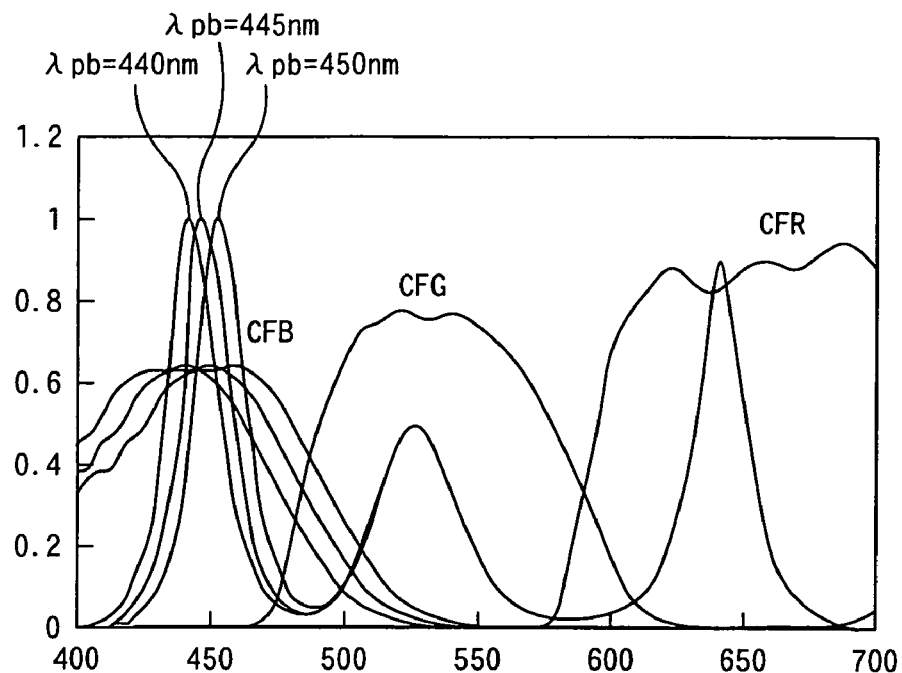
FIG. 23 is a graph showing the spectral characteristics of the color filter and the blue light emitting diode in case of shifting of the blue light emitting diode and the blue filter towards the short wavelength side.

FIG. 22 shows dependency of the NTSC ratio on the peak wavelength of the blue light emitting diode 21B, as found from the color gamut of FIG. 15, as measured in case of using the color filter 19Z, with non-zero transmittance of the red filter CFR in the wavelength range F in the vicinity of 400 nm to 450 nm in the transmission wavelength band of the blue filter CFB. FIG. 22 also shows dependency of the NTSC ratio on the peak wavelength of the blue light emitting diode 21B as found from the color gamut of FIG. 17, as measured in case of using the color filter 19A, with the zero transmittance of the red filter CFR in the wavelength range F in the vicinity of 400 nm to 450 nm.

If, in FIG. 22, attention is paid to the case of the peak wavelength $\lambda pb$ of 450 nm, it may be seen that the color filter 19A has been improved over the color filter 19Z by approximately 2%, specifically, from 108% to 110%, in terms of the NTSC ratio.

By using a color filter, improved over the color filter 19Z in the transmittance of the red filter CFR in the wavelength range F of 400 nm to 450 nm, it is possible to improve the NTSC ratio. FIG. 22 shows dependency of the NTSC ratio on the peak wavelength of the blue light emitting diode 21B, for the color filter 19Y, with the transmittance of 6% of the red filter CFR, at the wavelength of 400 nm, as shown in FIG. 12. This color filter 19Y has been improved over the color Filter 19Z by approximately 1%, specifically, from 108% to 109%, in terms of the NTSC ratio, for the peak wavelength $\lambda pb$ of 450 nm.

The color gamut of the region of the red (R) color has now been made wider by setting the transmittance of the red filter CFR in the transmission wavelength band of the blue filter CFB to zero or to 6% or less, as described above. Thus, if, with the color filters 19A, 19Y, having red filters CFR, the peak wavelength $\lambda pb$ of the blue light emitting diode 21B is shifted towards the short wavelength side for lowering the crossing point, the color purity may be raised further to give a wider color gamut. It is now contemplated to shift the blue filter CFB to the short wavelength side, in keeping with the shifting of the peak wavelength $\lambda pb$ of the blue light emitting diode 21B towards the short wavelength side.

In short, as the peak wavelength $\lambda pb$ of the blue light emitting diode 21B is shifted by 10 nm towards the short wavelength side from 450 nm to 440 nm, the peak wavelength Fpb of the blue filter CFB is also shifted by 20 nm towards the short wavelength side from 460 nm to 440 nm. In the description to follow, the color filter, corresponding to the color filter 19A, the blue filter CFB of which has its peak wavelength Fpb set so that 440 nm$\leq$Fpb$\leq$460 nm, is termed a color filter 19B.

Figure 24:
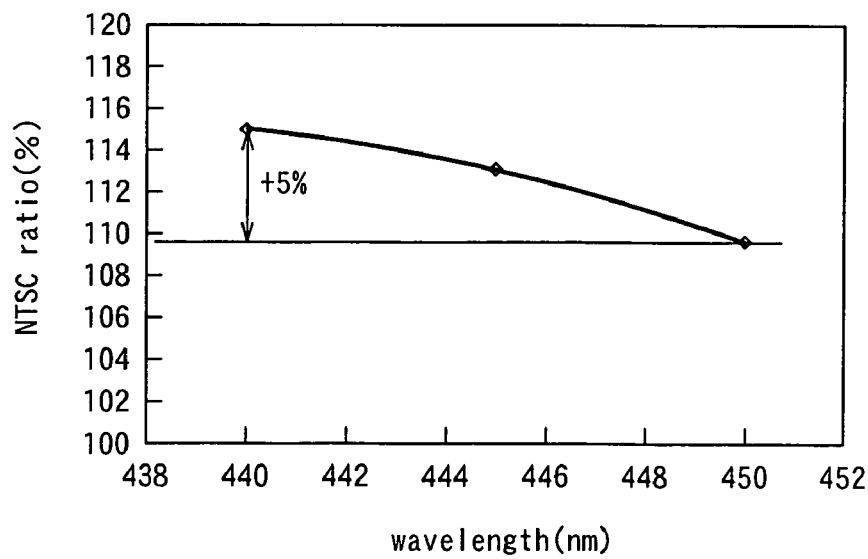
FIG. 24 is a graph showing the dependency of the NTSC ratio on the wavelength of the blue light emitting diode in case of shifting of the blue light emitting diode and the blue filter towards the short wavelength side.

FIG. 24 depicts a chart in which the NTSC ratio is plotted against the peak wavelength $\lambda pb$ of the blue light emitting diode 21B. As may be seen from FIG. 24, the NTSC ratio has been improved from 110% for the case of using the color filter 19A to 115%, that is, by 5%.

Figure 25:
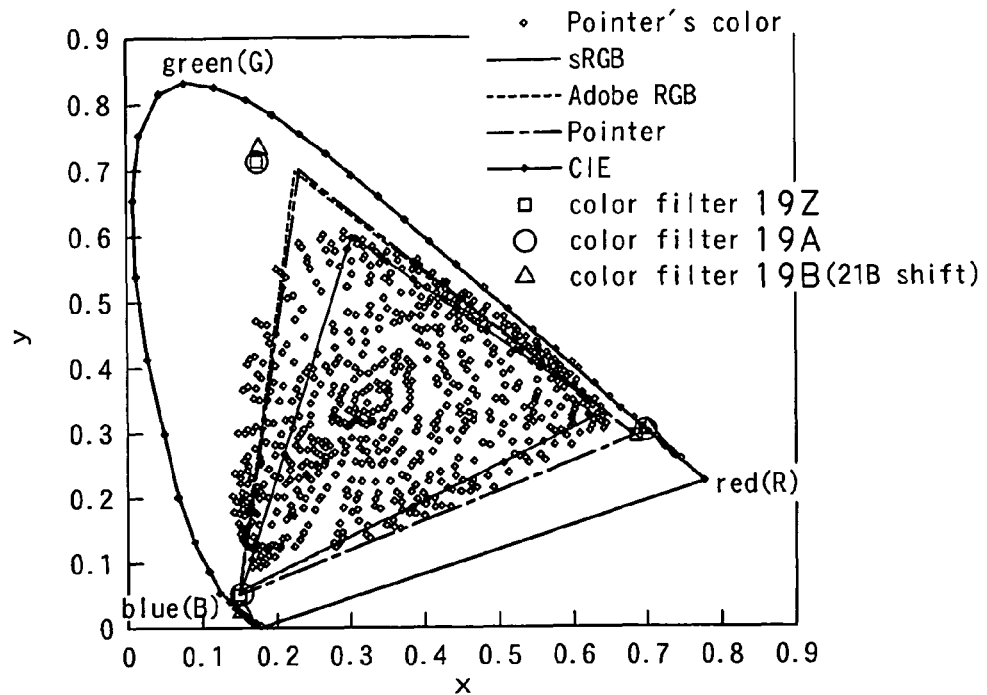
FIG. 25 is a graph showing the color reproducing range in case of shifting of the blue light emitting diode and the blue filter towards the short wavelength side.
Figure 26:
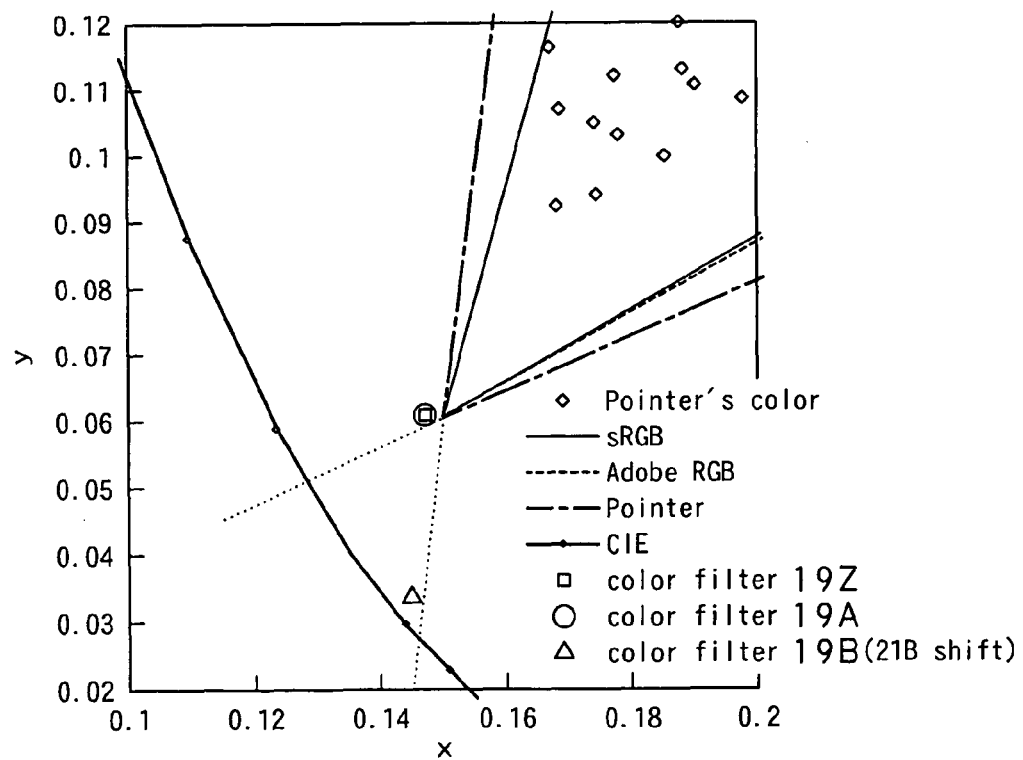
FIG. 26 is a graph showing the color gamut of the blue (B) region in case of shifting of the blue light emitting diode and the blue filter towards the short wavelength side.
Figure 27:
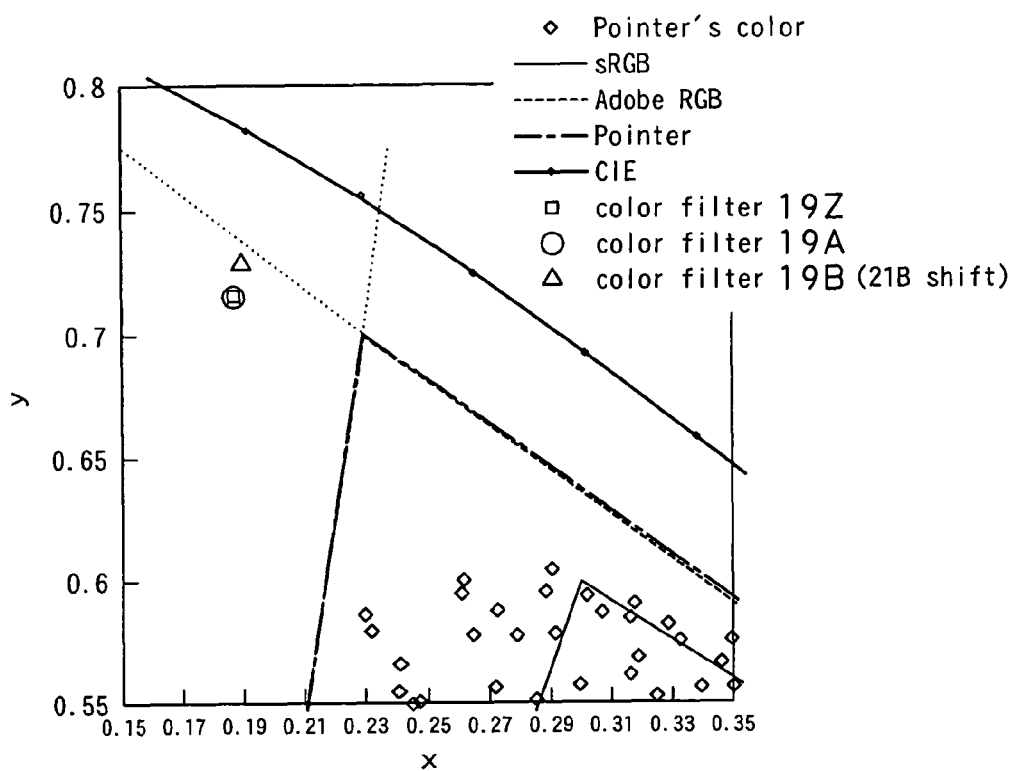
FIG. 27 is a graph showing the color gamut of the green (G) region in case of shifting of the blue light emitting diode and the blue filter towards the short wavelength side.
Figure 28:
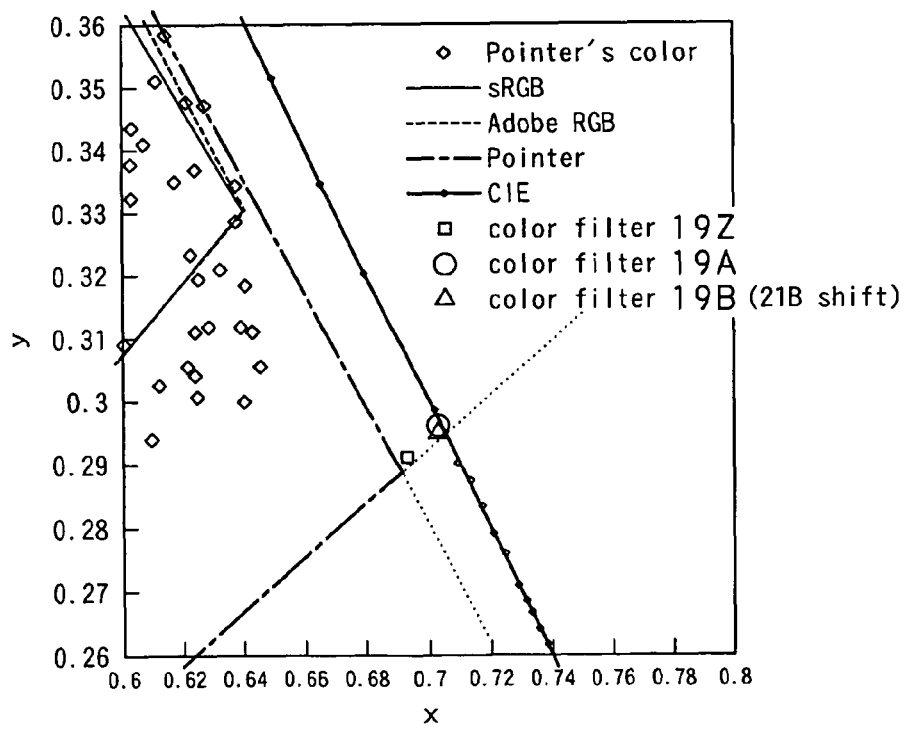
FIG. 28 is a graph showing the color gamut of the red (R) region in case of shifting of the blue light emitting diode and the blue filter towards the short wavelength side.

In FIG. 25, chromaticity points are plotted in the xy chromaticity diagram for verifying how much the chromaticity points have been improved in the respective regions of red (R) color, green (G) color and blue (B) color, when the color filter 19B having the peak wavelength Fpb=440 nm is used, at the same time as the peak wavelength $\lambda pb$ of the blue light emitting diode 21B has been shifted to 440 nm. FIGS. 26 to 28 illustrate the regions of the red (R) color, green (G) color and the blue (B) color to an enlarged scale, respectively. Meanwhile, in the xy chromaticity diagrams of FIGS. 25 to 28, there are also shown the Pointer's Color, the color reproducing range of the sRGB standard, the color reproducing range of the Adobe RGB standard, the color reproducing range of the Pointer standard, the XYZ color system prescribed by the Commission Internationale de l'Eclairage (CIE), chromaticity points of the color filter 19Z and chromaticity points of the color filter 19A.

As may become clearer from FIGS. 26 to 28, there are no changes in the chromaticity points in the region of red (R) color, however, the chromaticity points in the region of the blue (B) color are appreciably improved. Specifically, it may be seen that the color gamut has become approximately as broad as the Pointer standard, as the color reproducing range of sRGB is covered. It may also be seen that, in the green (G) region, the color gamut has slightly become broader, because of suppression of the color mixing with the blue light emitting diode 21B.

That is, by setting the peak wavelength $\lambda pb$ of the blue light emitting diode 21B so that 440 nm$\leq\lambda pb\leq$450 nm, and by using the color filter 19B, corresponding to the color filter 19A, the blue filter CFB of which has its peak wavelength Fpb set so that 440 nm$\leq$Fpb$\leq$460 nm, the color reproducing range may be enlarged appreciably.

EXAMPLE 2

Example in which the Peak Wavelength $\lambda pr$ of the Red Light Emitting Diode 21R is Shifted Towards the Long Wavelength Side As described above, in case the peak wavelength $\lambda pr$ of the red light emitting diode 21R is shifted towards the long wavelength side, the crossing point of the spectral curve with the transmission wavelength band of the green filter CFG is lowered, and hence the color reproducing range becomes broader.

Figure 29:
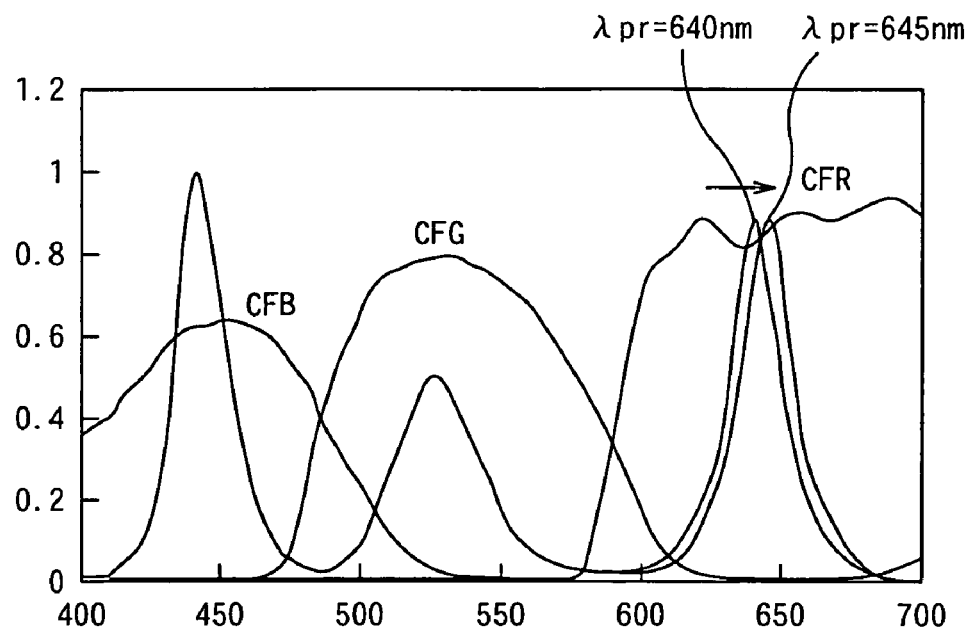
FIG. 29 is a graph showing the spectral characteristics of the color filter and the red light emitting diode in case the red light emitting diode has been shifted towards the long wavelength side.
Figure 30:
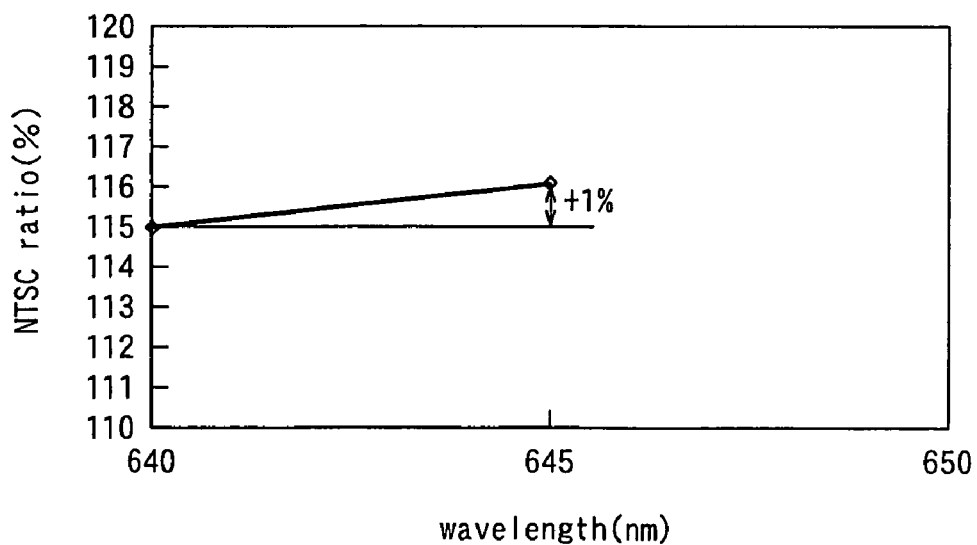
FIG. 30 is a graph showing the dependency of the NTSC ratio on the wavelength of the red light emitting diode in case the red light emitting diode has been shifted towards the long wavelength side.

Thus, as shown in FIG. 29, the peak wavelength $\lambda pr$ of the red light emitting diode 21R is shifted towards the long wavelength side from 640 nm by 5 nm, that is, to 645 nm, for the color filter 19B. FIG. 30 shows how the NTSC ratio is changed with changes in the peak wavelength $\lambda pr$ of the red light emitting diode 21R. It is seen from FIG. 30 that the NTSC ratio has been changed to 116% from 115%, that is, the NTSC ratio has been improved by 1%, for the case in which, with the use of the color filter 19B, the peak wavelength $\lambda pb$ of the blue light emitting diode 21B has been shifted to 440 nm.

Figure 31:
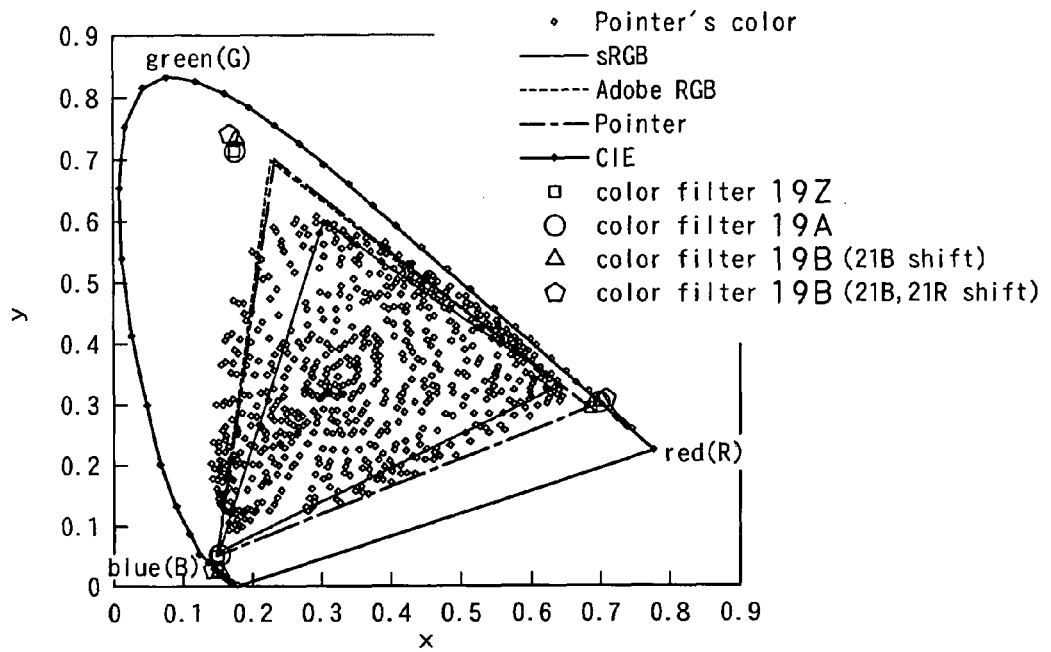
FIG. 31 is a graph showing the color reproducing range in case the red light emitting diode has been shifted towards the long wavelength side.
Figure 32:
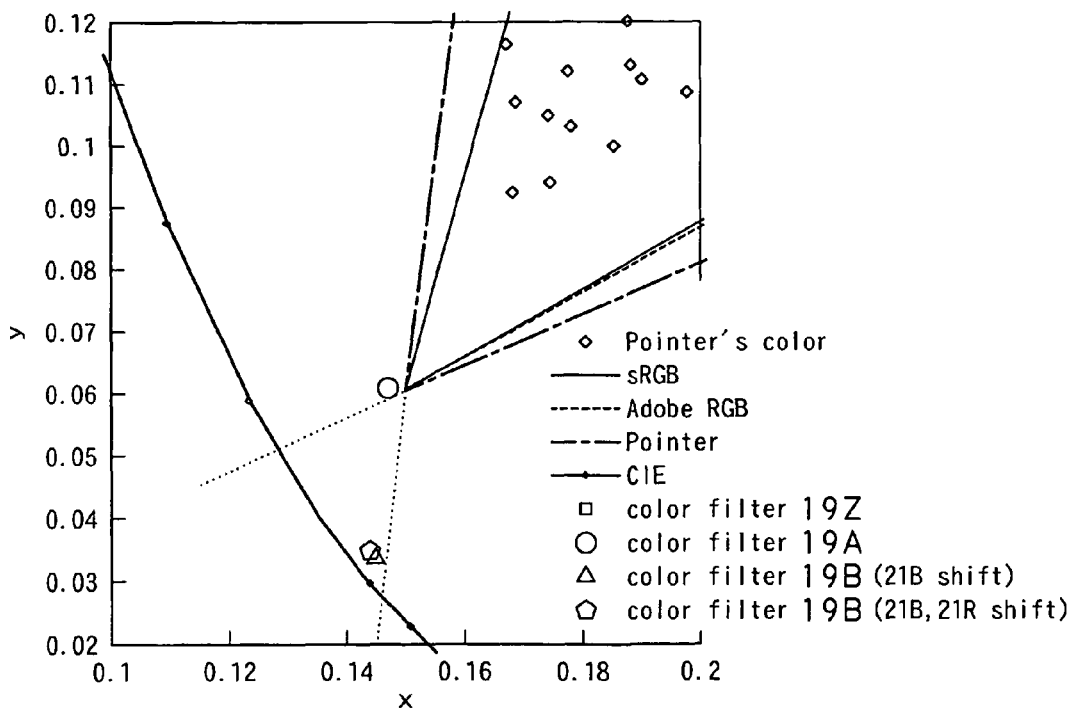
FIG. 32 is a graph showing the color gamut of the of the blue (B) region in case the red light emitting diode has been shifted towards the long wavelength side.
Figure 33:
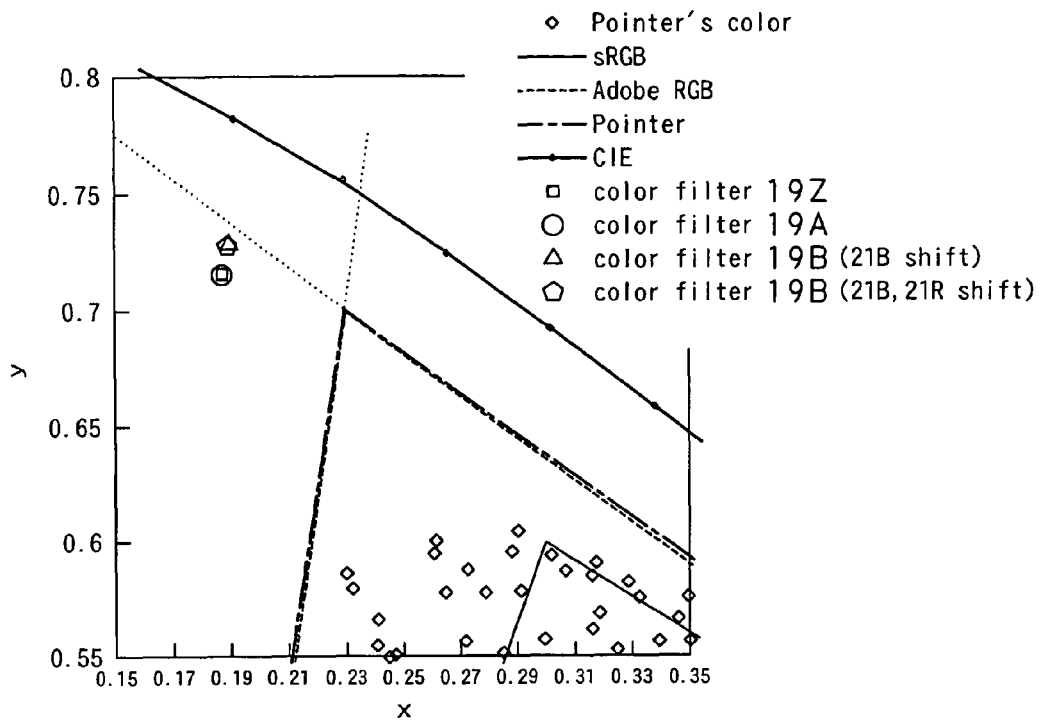
FIG. 33 is a graph showing the color gamut of the green (G) region in case the red light emitting diode has been shifted towards the long wavelength side.
Figure 34:
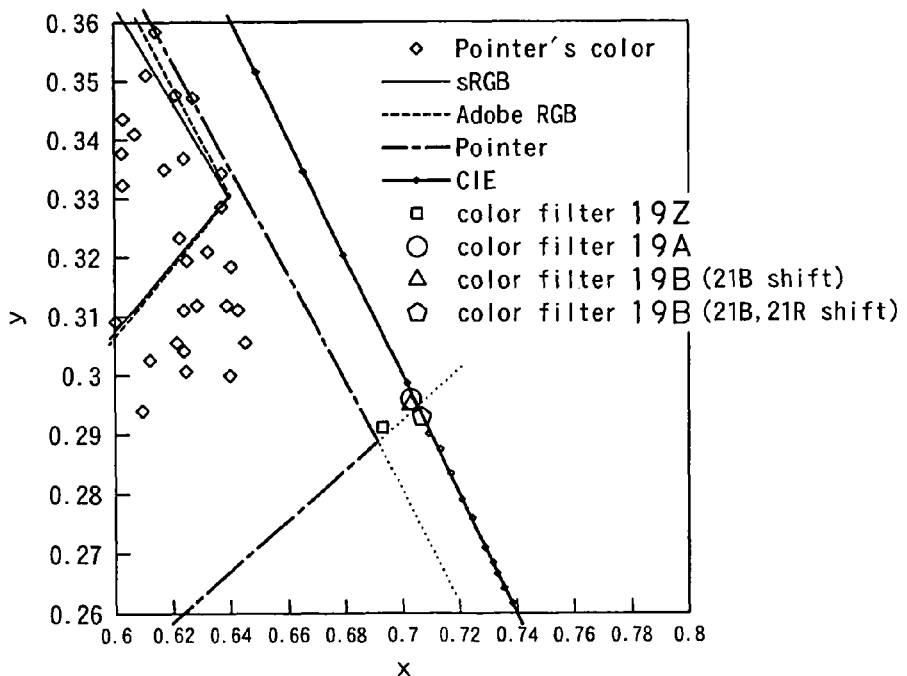
FIG. 34 is a graph showing the color gamut of the of the red (R) region in case the red light emitting diode has been shifted towards the long wavelength side.

In FIG. 31, chromaticity points are plotted in the xy chromaticity diagram for verifying how much the chromaticity points have been improved in the respective regions of red (R) color, green (G) color and blue (B) color, when the color filter 19B is used, the peak wavelength $\lambda pb$ of the blue light emitting diode 21B is shifted to 440 nm and the peak wavelength $\lambda pr$ of the red light emitting diode 21R has been shifted to 645 nm. FIGS. 32 to 34 illustrate the regions of the blue (B) color, green (G) color and the red (R) color to an enlarged scale, respectively. Meanwhile, in the xy chromaticity diagrams of FIGS. 31 to 34, there are also shown the Pointer's Color, the color reproducing range of the sRGB standard, the color reproducing range of the Adobe RGB standard, the color reproducing range of the Pointer standard, the XYZ color system prescribed by the Commission Internationale de l'Eclairage (CIE), chromaticity points of the color filter 19Z, chromaticity points of the color Filter 19A and chromaticity points in case of using the blue light emitting diode 21B with the peak wavelength λpb=440 nm in the color filter 19B.

As may become clearer from FIGS. 32 to 34, there are no changes in the chromaticity points in the region of the blue (B) color or in the green (G) color, however, the chromaticity points are slightly improved in the red (R) region, while the Munsell region of the Pointer's Color is covered. It should be noted that, at the current time point, it is extremely difficult, from the reason related with the manufacture technique, to make the peak wavelength λpr of the red light emitting diode 21R longer than 645 nm. For enlarging the color gamut, it is essential to elongate the wavelength of the red light emitting diode 21R even in time to come. It may be expected to improve the characteristics of the light emitting diode itself. If the red light emitting diode 21R, elongated in wavelength beyond the peak wavelength λpr, is produced in time to come, the color gamut will be enlarged further.

That is, by setting the peak wavelength λpb of the blue light emitting diode 21B so that 440 nm≦λpb≦450 nm, by using the color filter 19B, corresponding to the color filter 19A, the blue filter CFB of which has its peak wavelength Fpb set so that 440 nm≦Fpb≦460 nm, and by setting the peak wavelength λpr of the red light emitting diode 21R so that 640 nm≦λpr≦645 nm, the color reproducing range may be enlarged appreciably.

EXAMPLE 3

Example in which the Half-Value Width of the Green Filter CFG is Made Narrower to Make the Transmission Wavelength Band Narrower As described above, in case the transmission wavelength band of the green filter CFG is made narrower, the crossing points of the transmission wavelength band with the spectral curves of the red light emitting diode 21R and the green light emitting diode 21G, are lowered, and hence the color reproducing range becomes broader.

Figure 35:
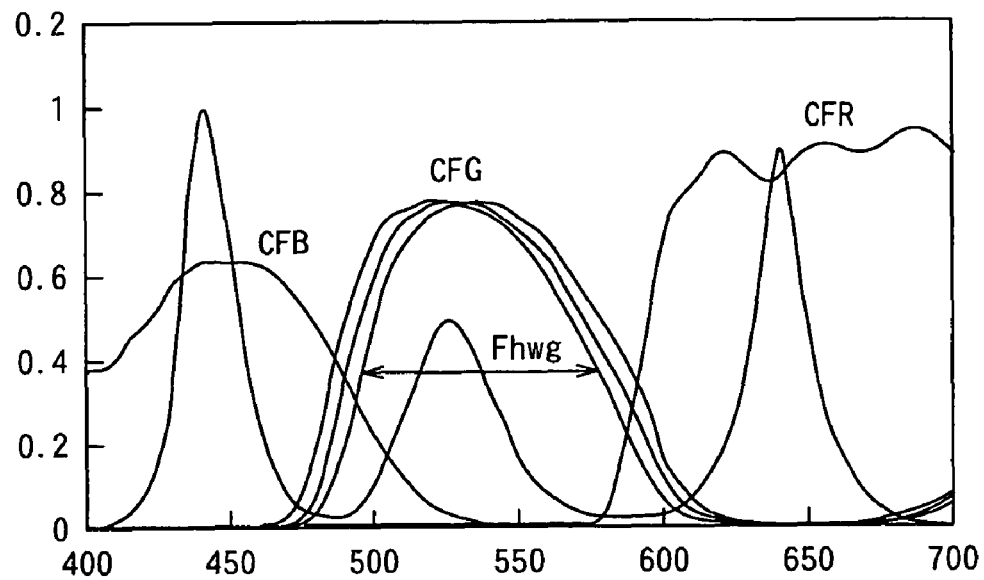
FIG. 35 is a graph showing spectral characteristics of the color filter and the light emitting diodes in case of narrowing down the half-value width of the green filter.

That is, the half-value width Fhwg of the green filter CFG is narrowed by equal amounts from 100 nm to 80 nm from the long wavelength side and from the short wavelength side, as shown in FIG. 35. In the description to follow, the color filter, in which the half-value width Fhwg of the green filter CFG of the color filter 19B is narrowed by equal amounts from the long wavelength side and from the short wavelength side so that 80 nm≦Fhwg≦100 nm, is termed a color filter 19C.

Figure 36:
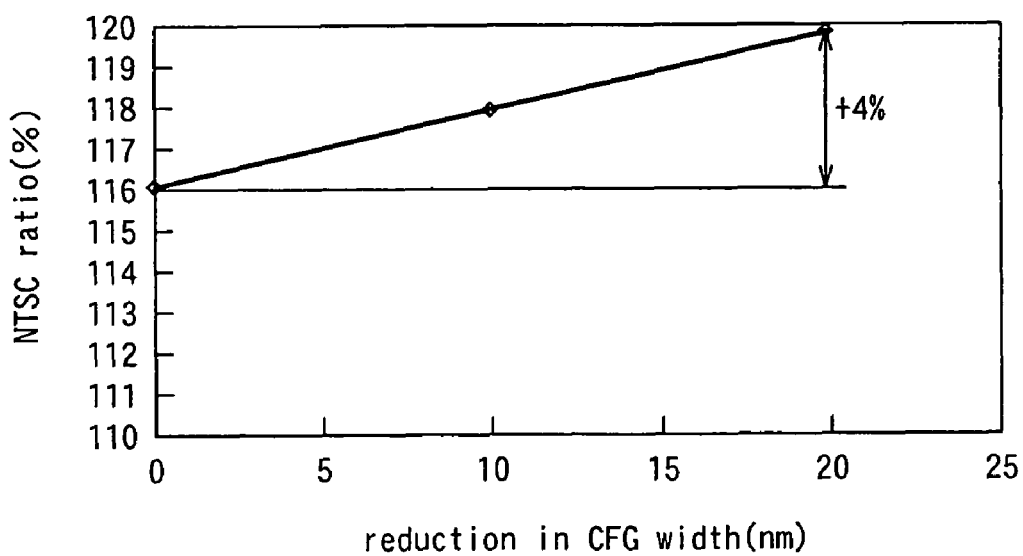
FIG. 36 is a graph showing the NTSC ratio plotted against the changes in the half-value width of the green filter.
Figure 37:
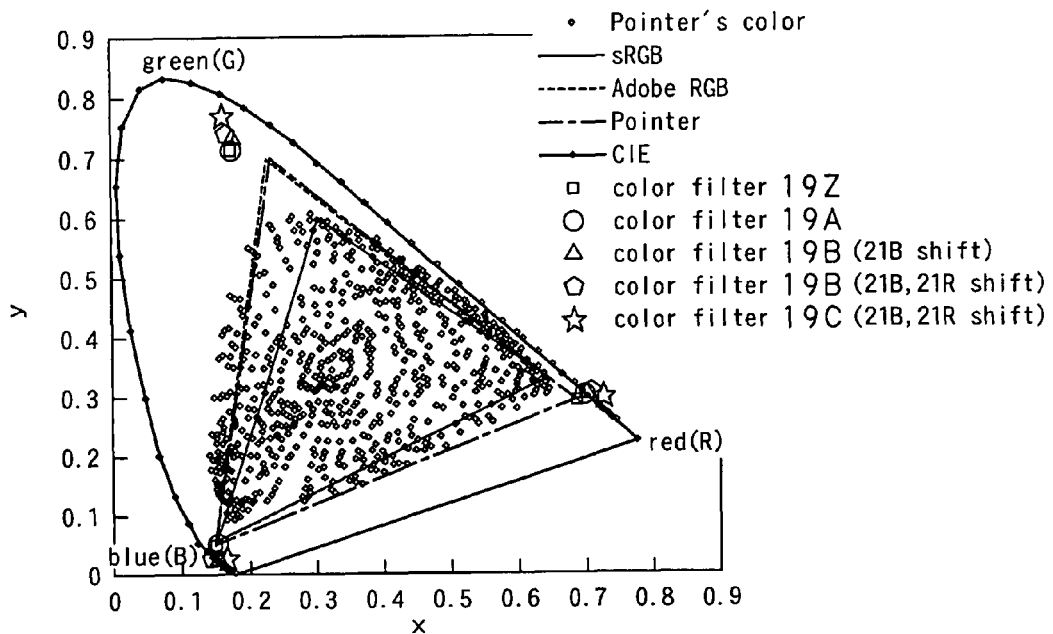
FIG. 37 is a graph showing the color reproducing range in case of narrowing down the half-value width of the green filter.
Figure 38:
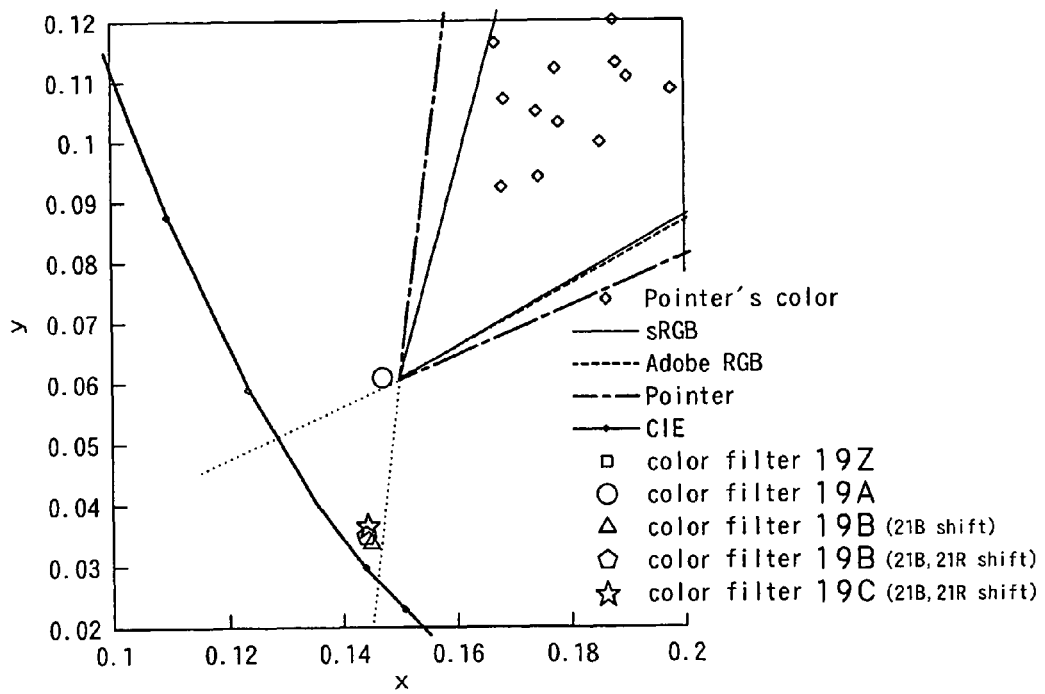
FIG. 38 is a graph showing the color gamut of the blue (B) region in case of narrowing down the half-value width of the green filter.
Figure 39:
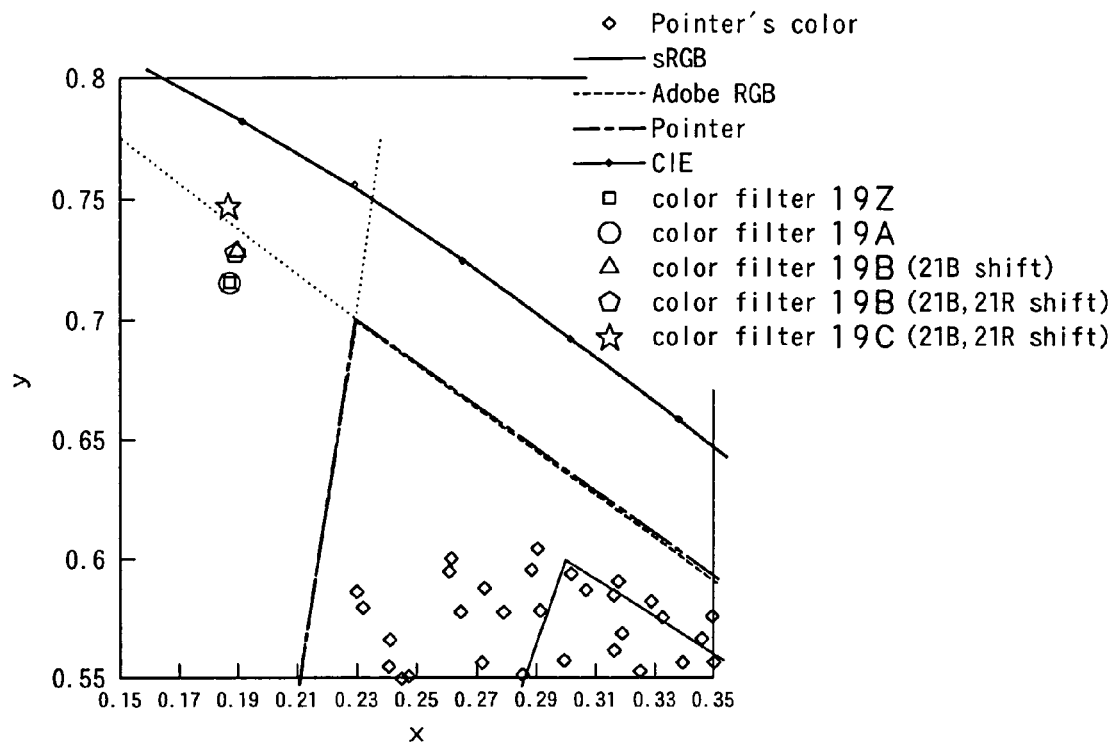
FIG. 39 is a graph showing the color gamut of the green (G) region in case of narrowing down the half-value width of the green filter.
Figure 40:
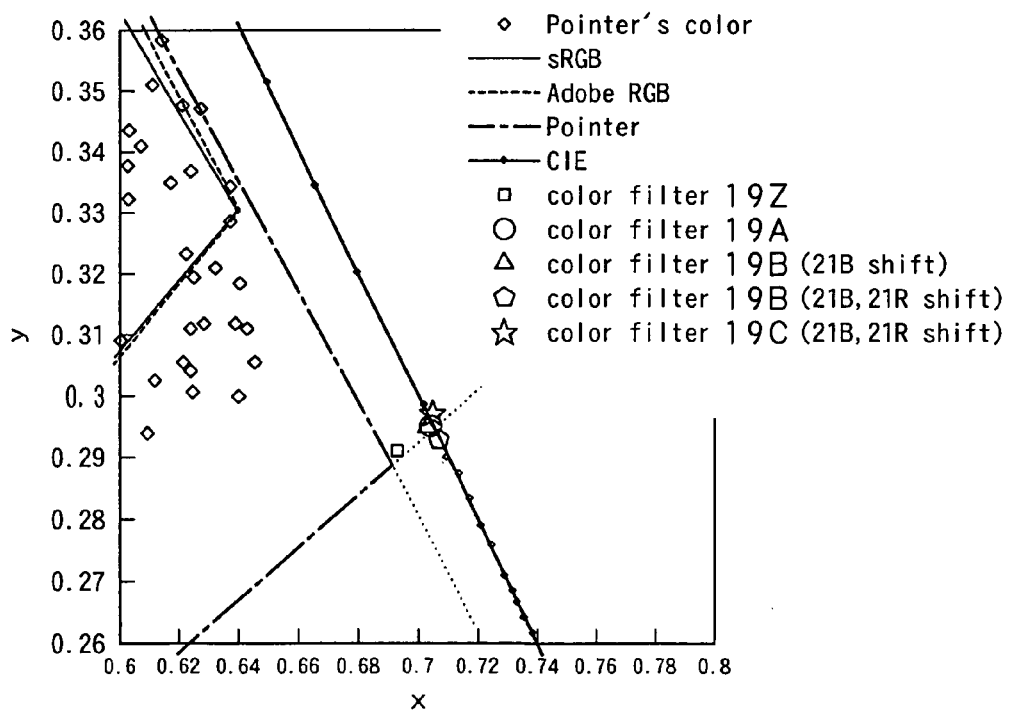
FIG. 40 is a graph showing the color gamut of the red (R) region in case of narrowing down the half-value width of the green filter.

FIG. 36 shows the manner in which the NTSC ratio is changed with changes in the half-value width Fhwg of the green filter CFG. As may be seen from FIG. 36, the NTSC ratio has been changed to 120% from 116%, which is a value for the case in which the color filter 19B is used and the peak wavelengths of the blue light emitting diode 21B and the red light emitting diode 21R are set so that λpb=440 nm and λpr=645 nm, and hence the NTSC ratio has been improved by 4%. In FIG. 37, chromaticity points are plotted in the xy chromaticity diagram for verifying how much the chromaticity points have been improved in the respective regions of red (R) color, green (G) color and blue (B) color, when the green filter CFG with Fhwg=80 nm is used, the peak wavelength λpb of the blue light emitting diode 21B is shifted to 440 nm and the peak wavelength λpr of the red light emitting diode 21R is shifted to 645 nm. FIGS. 38 to 40 illustrate the regions of the blue (B) color, green (G) color and the red (R) color to an enlarged scale, respectively. Meanwhile, in the xy chromaticity diagrams of FIGS. 37 to 40, there are also shown the Pointer's Color, the color reproducing range of the sRGB standard, the color reproducing range of the Adobe RGB standard, the color reproducing range of the Pointer standard, the XYZ color system prescribed by the Commission Internationale de l'Eclairage (CIE), chromaticity points of the color filter 19Z, chromaticity points of the color filter 19A, chromaticity points in case of using the blue light emitting diode 21B, with the peak wavelength λpb=440 nm, for the color filter 19B, and chromaticity points in case of using the blue light emitting diode 21B, with the peak wavelength λpb=440 nm, and the red light emitting diode 21B, with the peak wavelength λpr=645 nm, for the color filter 19B.

As may become clearer from FIGS. 38 to 40, there are no changes in the chromaticity points in the region of the blue (B) color or in the red (R) color, however, the chromaticity points are improved in the green (G) region and the color gamut is further enlarged, as the color reproducing range of the Adobe RGB standard, that is, the color reproducing range of the Pointer standard, is covered.

That is, the color filter 19C, in which the half-value width Fhwg of the green filter CFG of the color filter 19B is narrowed by equal amounts from the long wavelength side and from the short wavelength side so that 80 nm≦Fhwg≦100 nm, is used, while the peak wavelength λpb of the blue light emitting diode 21B is set so that 440 nm≦λpb≦450 nm and the peak wavelength λpr of the red light emitting diode 21R is set so that 640 nm≦λpr≦645 nm. This allows for further increasing the color reproducing range.

It should be noted that, in case the half-value width Fhwg of the green filter CFG is narrowed, luminance may sometimes be lowered. In case the luminance is lowered in this manner, it may be advisable to raise the transmittance of the green filter CFG, for example, in order to assure desired luminance values.

EXAMPLE 4

Further Improvement in Color Filter 19

In the above Examples 1 and 3, improvement in the color filter 19 has been explained. More specifically, in Example 1, as the peak wavelength λpb of the blue light emitting diode 21B is shifted to the shorter wavelength side for lowering the crossing point with the green filter CFG, the transmission wavelength band of the blue filter CFB is shifted to the short wavelength side, so that its peak wavelength will become 440 nm from 460 nm, for lowering the crossing point with the green light emitting diode 21G. In Example 3, the half-value width Fhwg of the green filter CFG is reduced by equal amounts on the short and long wavelength sides from 100 nm to 80 nm, in order to narrow down the transmission wavelength band of the green filter CFG, so as to lower the crossing point with the red light emitting diode 21R and the crossing point with the blue light emitting diode 21B.

In Example 4, the color filter 19 is to be improved further for raising color purity and for providing for a wider color gamut, to add to the above improvements.

Figure 41:
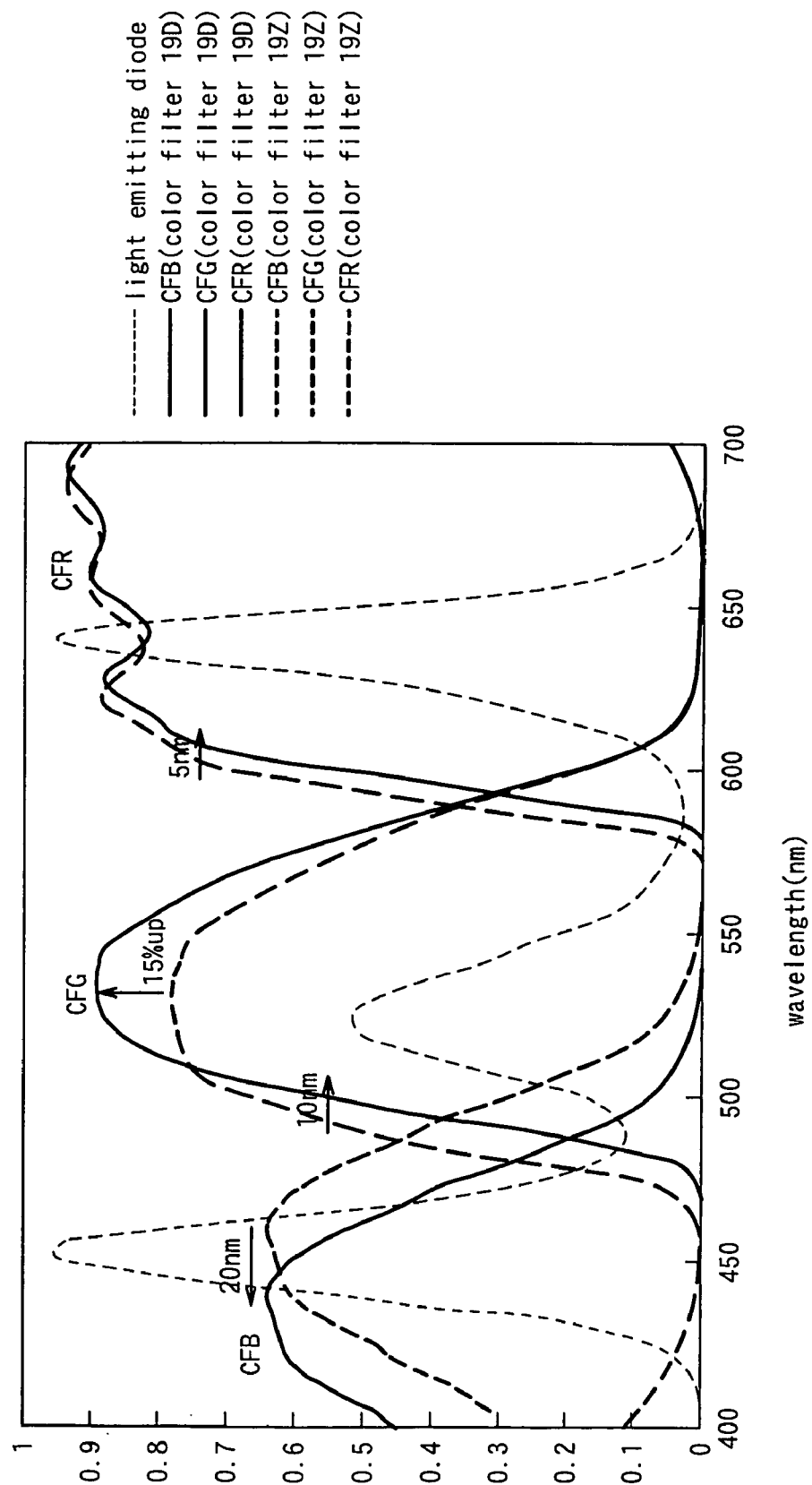
FIG. 41 is a graph showing the spectral characteristics of a newly improved color filter and those of the light emitting diodes.

FIG. 41 shows spectral characteristics of the color filter 19 newly improved, and spectral characteristics of the light emitting diode 21. The spectral characteristics, shown by thick broken line in FIG. 41, are spectral characteristics of the color filter 19Z shown in FIG. 12. The spectral characteristics, shown by thick solid line, are newly improved spectral characteristics of the color filter 19Z, and the spectral characteristics, shown by thin solid line, are those of the respective light emitting diodes 21. The peak wavelengths of the blue light emitting diode 21B and the red light emitting diode 21R are not shifted to the short wavelength side and to the long wavelength side, respectively, as in the Examples 1 and 3, and are of the reference peak wavelengths shown in FIG. 12.

The blue filter CFB has its peak wavelength Fpb shifted by 20 nm from 460 nm to 440 nm, so that its transmission wavelength band will be shifted to the short wavelength side, as may be seen from the spectral characteristics of the color filter 19, shown in FIG. 41.

The red filter CFR has its peak wavelength Fpr shifted by 5 nm from 685 nm to 690 nm, so that its transmission wavelength band will be shifted to the long wavelength side.

The green filter CFG has its half-value width Fhwg shifted by 10 nm from 100 nm to 90 nm, so that only the transmission wavelength band on the short wavelength side crossing the blue light emitting diode 21B will be shifted towards the long wavelength side. In addition, the overall transmittance of the green filter CFG is raised by 15% to compensate for decrease in the transmission wavelength band.

In the description to follow, a color filter in which the peak wavelength Fpb of the blue filter CFB of the color filter 19Z is set so that 440 nm$\leq$Fpb$\leq$460 nm, the peak wavelength Fpr of the red filter CFR is set so that 685 nm$\leq$Fpr$\leq$690 nm, the peak wavelength Fpg of the green filter CFG is set to 530 nm, and in which the half-value width Fhwg of the spectrum of the green filter is set, by narrowing the transmission wavelength band on the short wavelength side, so that 90 nm$\leq$Fhwg $\leq$100 nm, while the transmittance of the green filter CFG is raised by 15%, is termed a color filter 19D.

Figure 42:
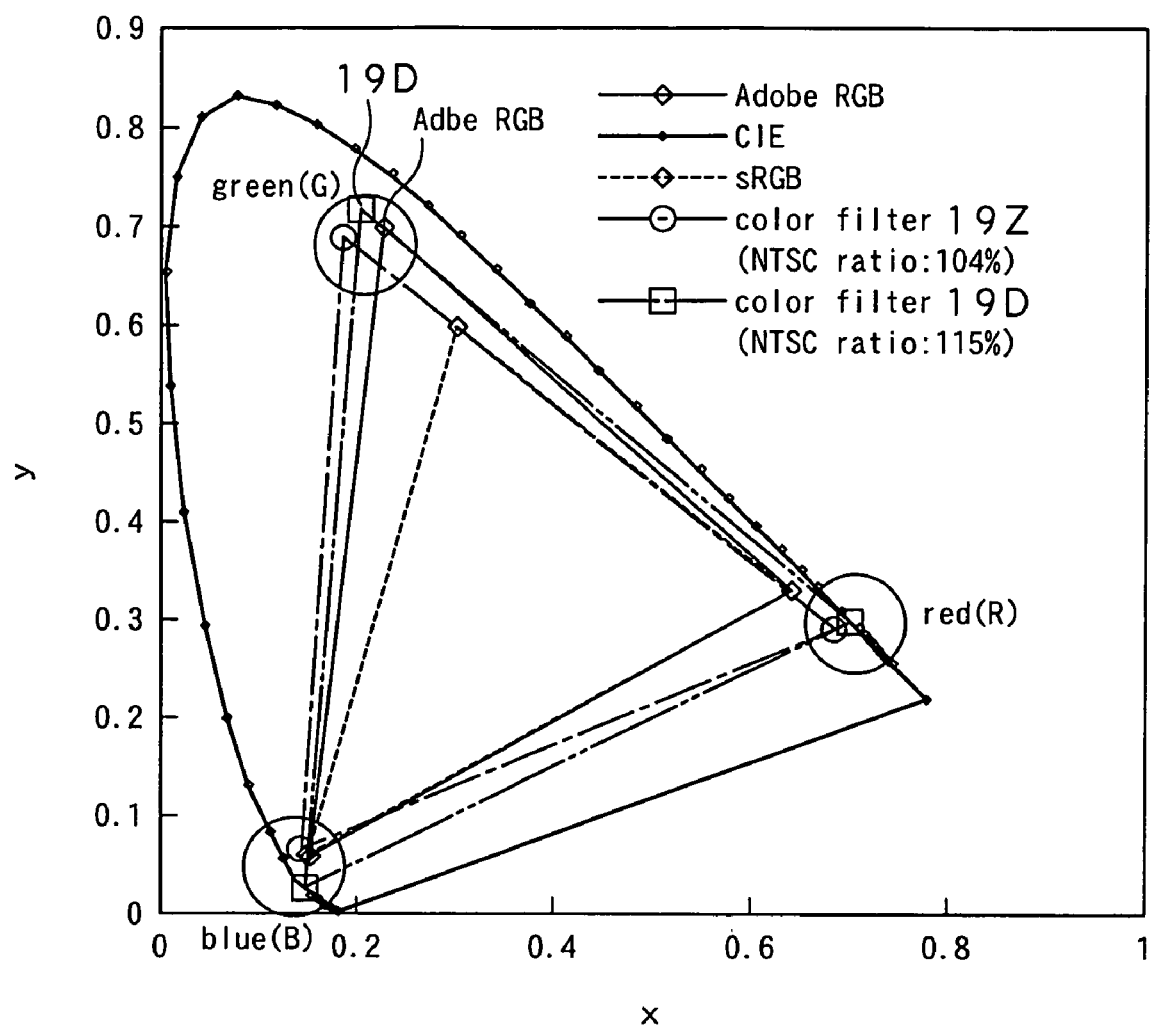
FIG. 42 is a graph showing the color reproducing range in case of using the newly improved color filter.

In FIG. 42, the color reproducing range is shown in the xy chromaticity diagram for verifying how much the chromaticity points have been improved in the respective regions of red (R) color, green (G) color and blue (B) color, with use of the color filter 19D, in which Fpb=440 nm, Fpg=530 nm and Fpr=690 nm, and Fhwg=90 nm, and in which the transmittance of the green filter CFG is raised by 15%. Meanwhile, in the xy chromaticity diagrams of FIG. 42, there are also shown the color reproducing range of the Adobe RGB standard, the color reproducing range of the XYZ color system prescribed by the Commission Internationale de l'Eclairage (CIE), and the chromaticity points of the color filter 19Z.

It is seen from FIG. 42 that, with the use of the color filter 19D, the color gamuts for the regions of the blue (B) color and the red (R) color are broader than not only the color gamut for the sRGB standard but also than the color gamut of the Adobe RGB standard or that of the color filter 9Z.

That is, with the use of the color filter 19D, corresponding to the color filter 19Z, having the blue filter CFB, the peak wavelength of which is such that 440 nm$\leq$Fpb$\leq$460 nm, having the red filter CFR, the peak wavelength Fpr of the which is such that 685 nm$\leq$Fpr$\leq$690 nm, and having the green filter CFG, the peak wavelength Fpg of which is 530 nm, with the half-value width Fhwg of the spectrum of the green filter being set, by narrowing the transmission wavelength band on the short wavelength side, so that 90 nm$\leq$Fhwg$\leq$100 nm, with the transmittance of the green filter CFG being raised by 15%, it is possible to enlarge the color reproducing range appreciably.

It is however seen that, as in the case of the color filter 19Z, the color gamut of the region of the green color (G) cannot cover the color gamut of the Adobe RGB standard. In the Example 5, now described, this point is improved and, additionally, the light emitting diode 21, having characteristics of further enlarging the color gamut, is selected, by way of optimization.

EXAMPLE 5

Further Optimization of the Light Emitting Diode 21

Figure 43:
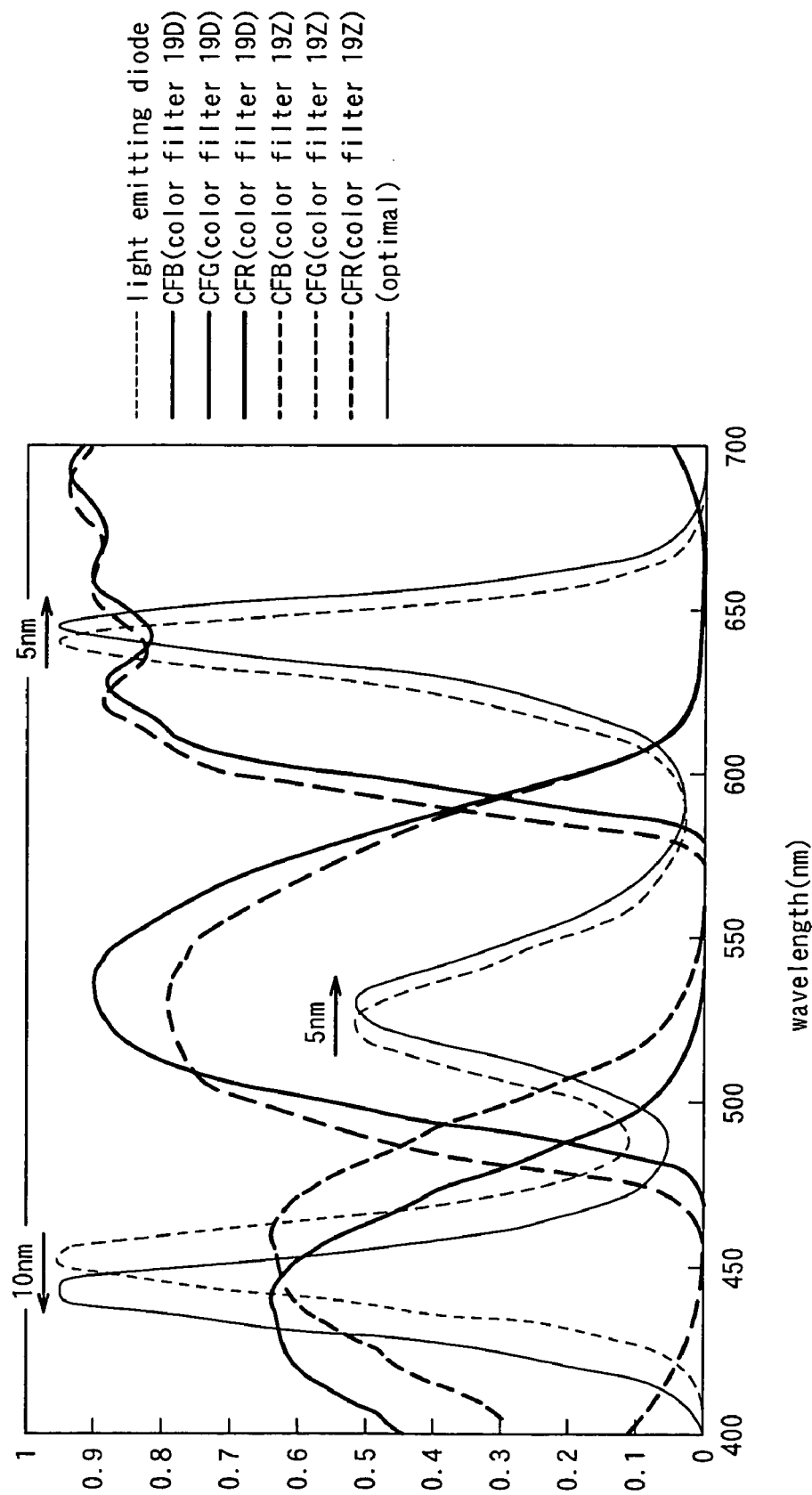
FIG. 43 is a graph showing the spectral characteristics of a newly improved color filter and those of newly optimized light emitting diodes.

FIG. 43 shows spectral characteristics of the aforementioned color filter 19Z, indicated by thick broken line, spectral characteristics of the color filter 19D, indicated by thick solid line, spectral characteristics of the light emitting diode 21, before optimization, indicated by fine broken line, and spectral characteristics of the light emitting diode 21, after optimization, indicated by fine solid line.

Referring to FIG. 43, the peak wavelength $\lambda$pb of the blue light emitting diode 21B is shifted by 10 nm, specifically, from 450 nm to 440 nm, towards the short wavelength side, the peak wavelength $\lambda$pg of the green light emitting diode 21G is shifted by 5 nm, specifically, from 525 nm to 530 nm, towards the short wavelength side, and the peak wavelength $\lambda$pr of the red light emitting diode 21R is shifted by 5 nm, specifically, from 640 nm to 645 nm, towards the long wavelength side.

The shifting by 10 nm of the blue light emitting diode 21B towards the short wavelength side, and the shifting by 5 nm of the red light emitting diode 21R towards the long wavelength side, are as described above with reference to the Examples 1 and 2. If, on the other hand, the green light emitting diode 21G, the peak wavelength $\lambda$pg of which has been shifted towards the long wavelength side, is used, the crossing point with the blue filter CFB may be lowered, because the distance d1 between the peak wavelength $\lambda$pb of the blue light emitting diode 21B and the peak wavelength $\lambda$pg of the green light emitting diode 21G is enlarged, as explained with reference to FIG. 12, and hence it is possible to lower the crossing point with the blue filter CFB. The result is that it is possible to improve color purity and to enlarge the color gamut of the green region.

Figure 44:
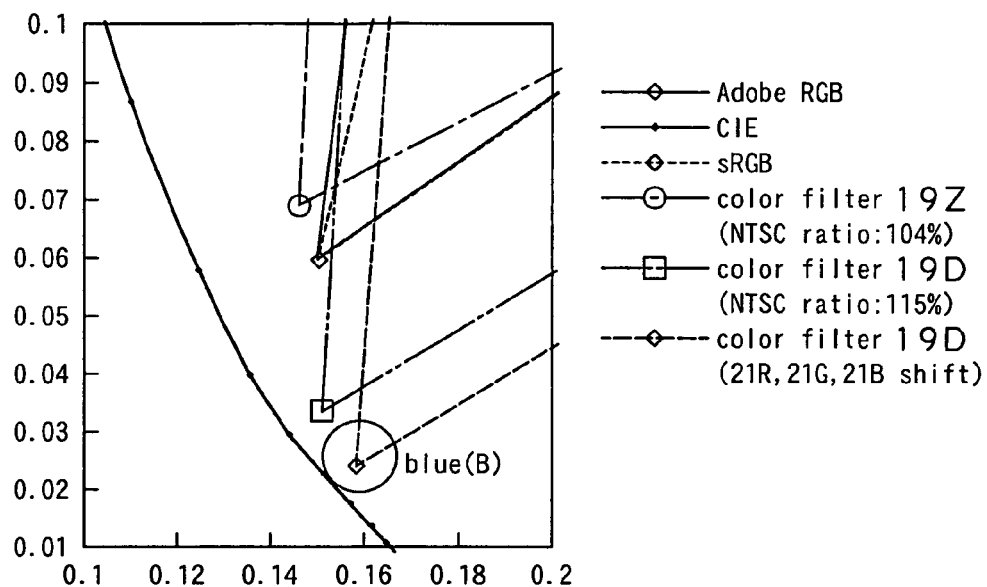
FIG. 44 is a graph showing the color gamut of the blue (B) color region in case of using the newly improved color filter shown in FIG. 41 and the newly optimized light emitting diodes.
Figure 45:
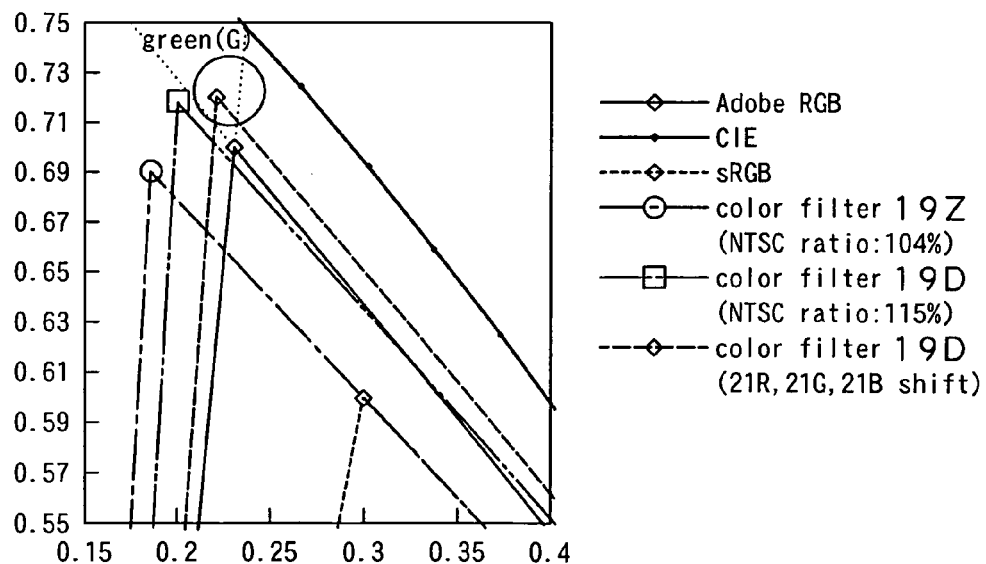
FIG. 45 is a graph showing the color gamut of the green (G) region in case of using the newly improved color filter shown in FIG. 41 and the newly optimized light emitting diodes.
Figure 46:
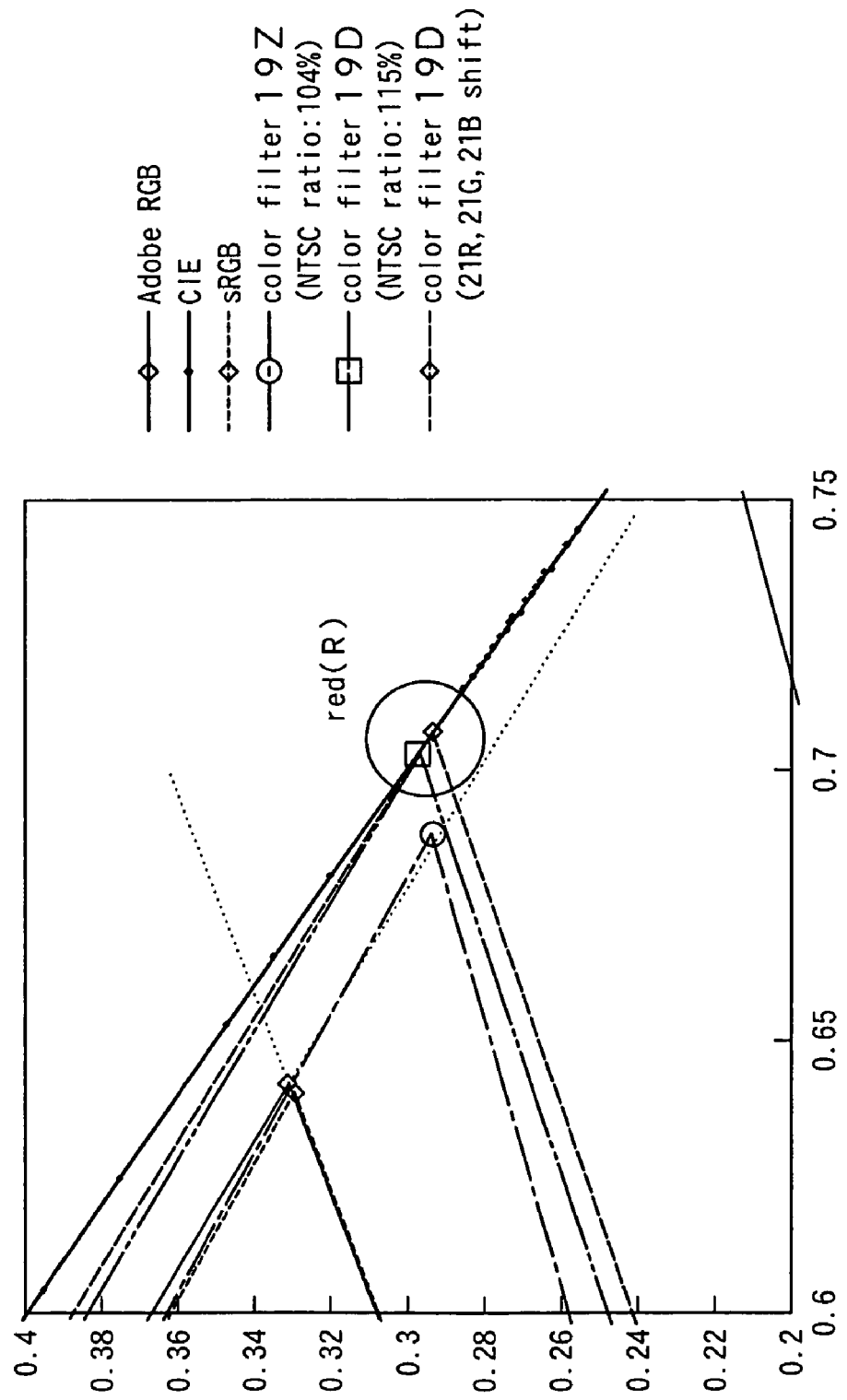
FIG. 46 is a graph showing the color gamut of the red (R) region in case of using the newly improved color filter shown in FIG. 41 and the newly optimized light emitting diodes.

In FIGS. 44 to 46, the color reproducing range is indicated in the xy chromaticity diagram for verifying how much the chromaticity points have been improved in the respective regions of red (R) color, green (G) color and blue (B) color, in case the color filter 19D is used and the light emitting diode 21 is optimized as shown in FIG. 43. Meanwhile, in the xy chromaticity diagrams of FIG. 44 to 46, there are also shown the color reproducing range of the Adobe RGB standard, the color reproducing range of the Pointer standard, the XYZ color system prescribed by the Commission Internationale de l'Eclairage (CIE), the color reproducing range of the sRGB standard, the color reproducing range of the color filter 19Z and the chromaticity points of the color filter 19D.

As will become clearer from FIGS. 44 to 46, the color gamut for each color region is enlarged. In particular, the region of the green (G) color, not improved in the Example 4, shown in FIG. 45, as well as the region of the red (R) color, shown in FIG. 46, surpasses the color reproducing range of the RGB standard.

The NTSC ratio at this time is 116%, appreciably higher than 105% which is the value of the NTSC ratio in case of using the color filter 19Z. Moreover, the loss in luminance, ascribable to reducing the half-value width of the green filter CFG to provide for wide color gamut, is compensated by increasing the transmittance of the green light, exhibiting higher visibility, by 15%, and hence there is no risk of lowering the luminance.

That is, by using the color filter 19D, setting the peak wavelength $\lambda$pb of the blue light emitting diode 21B so that 440 nm$\leq$$\lambda$pb$\leq$450 nm, setting the peak wavelength $\lambda$pr of the red light emitting diode 21R so that 640 nm$\leq$$\lambda$pr$\leq$645 nm, and by setting the peak wavelength $\lambda$pg of the green light emitting diode 21G so that 525 nm≦λpg≦530 nm, the color reproducing range may further be enlarged appreciably.

With the color liquid crystal display apparatus 100, configured as described above, the color reproducing range of a picture displayed on the color liquid crystal display panel 10 may be enlarged by matching the characteristics of the red filter CFR, green filter CFG and the blue filter CFB, provided on the color liquid crystal display panel 10, to the characteristics of the light emitting diodes 21R, 21G and 21B, provided on the backlight device 20, by way of optimization.

Meanwhile, it is not essential to use all of the items of improvement of the respective color filters of the color filter 19 or all of the optimized light emitting diodes 21, shown in the Examples 1 to 5, in combination. On the contrary, these items of improvement of the respective color filters or the optimized light emitting diodes may be used selectively or by themselves for enlarging the color reproducing range.

The color liquid crystal display apparatus 100, shown as examples of the present invention, is provided with a subjacent backlight device 20 in which the light source is arranged directly below the color liquid crystal display panel 10. The present invention is not limited to this configuration and similar favorable effects may be displayed in case of using an edge lit display in which the light from the light source arranged laterally of the light guide plate as a backlight device is subjected to color mixing by the light guide plate.

The present invention is not limited to the particular configurations of the embodiments described above with reference to the drawings. It will be appreciated that the present invention may encompass various changes or corrections such as may readily be arrived at by those skilled in the art within the scope and the principle of the invention.

The invention claimed is:

1. A color filter of a transmissive color liquid crystal display panel, the color filter comprising a tristimulus color filter for wavelength-selecting and transmitting red light, green light and blue light, the color filter comprising:
a red filter having a peak wavelength of a transmission wavelength band Fpr such that 685 nm≦Fpr≦690 nm;
wherein overlaying of a transmission wavelength band of a red filter on a transmission wavelength band of a blue filter is substantially precluded for preventing color mixing of blue and red colors.

2. The color filter according to claim 1, wherein said red filter has transmittance for light with a wavelength of 400 nm set so as to be less than or equal to 6%.

3. The color filter according to claim 1, further comprising a blue filter having a peak wavelength of a transmission wavelength band Fpb such that 440 nm≦Fpb≦460 nm.

4. A color liquid crystal display apparatus including a transmissive color liquid crystal display panel provided with a color filter, the color filter comprising a tristimulus filter for wavelength-selecting and transmitting red light, green light and blue light, and a backlight device for illuminating said color liquid crystal display panel with white light from a backside thereof, the color liquid crystal display apparatus comprising:
a light source comprising a red light emitting diode to emit red light and having a peak wavelength λpr such that 640 nm≦λpr≦645 nm;
wherein overlaying of a transmission wavelength band of a red filter on a transmission wavelength band of a blue filter is substantially precluded for preventing color mixing of blue and red colors.

5. The color liquid crystal display apparatus according to claim 4, wherein said red filter has transmittance for light with a wavelength of 400 nm set so as to be less than or equal to 6%.

6. The color liquid crystal display apparatus according to claim 4, wherein said backlight device includes a light source comprising a red light emitting diode to emit red light, a green light emitting diode to emit green light and a blue light emitting diode to emit blue light and having a peak wavelength λpb such that 440 nm≦λpb≦460 nm, and
color mixing means for mixing the red light, green light and blue light, radiated from said light source, to create said white light.

7. The color liquid crystal display apparatus according to claim 4, further comprising a blue filter having a peak wavelength of a transmission wavelength band Fpb such that 440 nm≦Fpb≦460 nm.

8. A color liquid crystal display apparatus including a transmissive color liquid crystal display panel provided with a color filter, the color filter comprising a tristimulus filter for wavelength-selecting and transmitting red light, green light and blue light, and a backlight device for illuminating said color liquid crystal display panel with white light from a backside thereof, wherein
said backlight device includes
a light source comprising a red light emitting diode to emit red light and having a peak wavelength λpr such that 640 nm≦λpr≦645 nm, a green light emitting diode to emit green light and having a peak wavelength λpg such that 525 nm≦λpg≦530 nm, and a blue light emitting diode to emit blue light and having a peak wavelength λpb such that 440 nm≦λpb≦450 nm, and
a color mixing unit for mixing the red light, green light and blue light radiated from said light source to create said white light, and
said color filter comprises a red filter having a peak wavelength of a transmission wavelength band Fpr such that 685 nm≦Fpr≦690 nm, said transmission wavelength band of said red filter not substantially overlapping with a transmission wavelength band of said blue filter to prevent color mixing of blue and red colors, a green filter having a peak wavelength of a transmission wavelength band Fpg of 530 nm and the half-value width of a transmission wavelength band Fhwg such that 80 nm≦Fhwg≦100 nm, and a blue filter having a peak wavelength of a transmission wavelength band Fpb such that 440 nm≦Fpb≦460 nm.

9. The color liquid crystal display apparatus according to claim 8, wherein said red filter has transmittance for light with the wavelength of 400 nm set so as to be less than or equal to 6%.

* * * * *